United States Patent
Yi et al.

(10) Patent No.: US 9,705,751 B1
(45) Date of Patent: Jul. 11, 2017

(54) SYSTEM FOR CALIBRATING AND VALIDATING PARAMETERS FOR OPTIMIZATION

(71) Applicant: SAS Institute Inc., Cary, NC (US)

(72) Inventors: Jinxin Yi, Raleigh, NC (US); Necip Baris Kacar, Raleigh, NC (US); Varunraj Valsaraj, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/335,070

(22) Filed: Oct. 26, 2016

Related U.S. Application Data

(60) Provisional application No. 62/316,024, filed on Mar. 31, 2016.

(51) Int. Cl.
G06F 15/177 (2006.01)
H04L 12/24 (2006.01)

(52) U.S. Cl.
CPC ........ *H04L 41/147* (2013.01); *H04L 41/0823* (2013.01); *H04L 41/145* (2013.01)

(58) Field of Classification Search
CPC .. H04L 41/147; H04L 41/145; H04L 41/0823
See application file for complete search history.

(56) References Cited

U.S. PATENT DOCUMENTS

| | | | |
|---|---|---|---|
| 8,515,835 B2 | 8/2013 | Wu et al. | |
| 9,092,561 B2 * | 7/2015 | Miao | G06F 11/3612 |
| 2009/0216611 A1 | 8/2009 | Leonard et al. | |
| 2011/0099101 A1 * | 4/2011 | Emery | G06Q 40/02 |
| | | | 705/38 |
| 2011/0246385 A1 * | 10/2011 | Laxmanan | G06Q 10/067 |
| | | | 705/348 |
| 2011/0258011 A1 * | 10/2011 | Burns | G06Q 10/06 |
| | | | 705/7.15 |
| 2012/0278663 A1 * | 11/2012 | Hasegawa | G06F 11/0709 |
| | | | 714/47.1 |
| 2016/0026481 A1 * | 1/2016 | Gordon | G06F 9/44526 |
| | | | 717/174 |
| 2016/0088153 A1 * | 3/2016 | Wicaksono | H04M 3/5175 |
| | | | 379/265.06 |
| 2016/0098681 A1 * | 4/2016 | Canis | G06Q 40/12 |
| | | | 705/301 |
| 2016/0292324 A1 | 10/2016 | Leonard et al. | |

OTHER PUBLICATIONS

SAS Institute Inc. 2015. SAS® Forecast Server Procedures 14.1: User's Guide. Cary, NC: SAS Institute Inc., Jul. 2015.
SAS Institute Inc. 2015. SAS/ETS® 14.1 User's Guide. Cary, NC: SAS Institute Inc., Jul. 2015.
SAS Institute Inc. 2016. SAS® Inventory Optimization Workbench 5.3: User's Guide. Cary, NC: SAS Institute Inc., May 2016.
SAS Institute Inc. 2010. SAS/OR® 9.22 User's Guide: Mathematical Programming. Cary, NC: SAS Institute Inc., May 2010.
SAS Institute Inc. 2009. SAS® Inventory Optimization 2.1: User's Guide. Cary, NC: SAS Institute Inc., Jul. 2009.

\* cited by examiner

*Primary Examiner* — Richard G Keehn
(74) *Attorney, Agent, or Firm* — Bell & Manning, LLC

(57) ABSTRACT

A computing device quantifies an expected benefit from a calibrated coefficient of variation (CV) and/or a calibrated service level (SL). The target optimization model determines a number and a time a new requisition is placed for an item at each node of the plurality of nodes. A validation time value is updated using an incremental time value and the process is repeated until the validation time value is greater than or equal to a stop time.

30 Claims, 17 Drawing Sheets

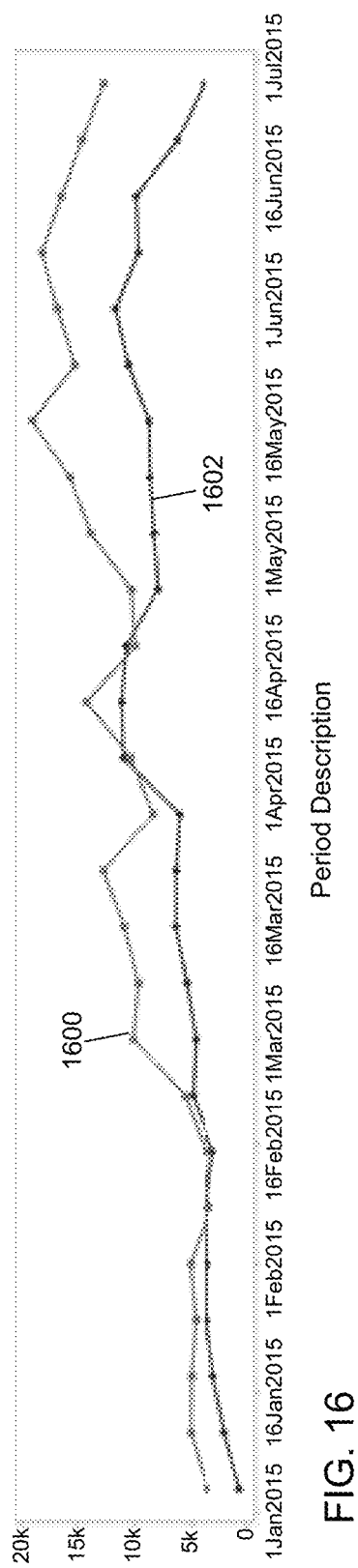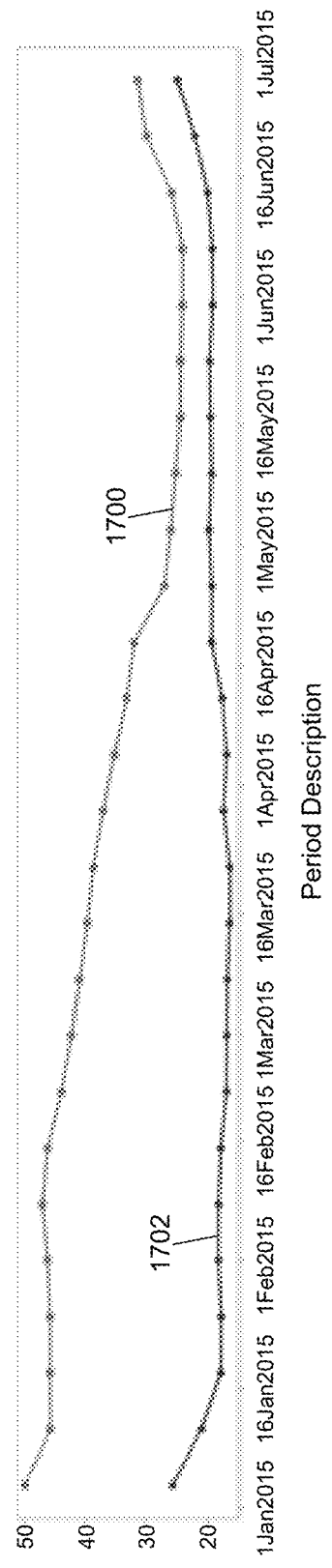

SYSTEM FOR CALIBRATING AND VALIDATING PARAMETERS FOR OPTIMIZATION

CROSS-REFERENCE TO RELATED APPLICATIONS

The present application claims the benefit of 35 U.S.C. §119(e) to U.S. Provisional Patent Application No. 62/316,024 filed on Mar. 31, 2016, the entire contents of which is hereby incorporated by reference.

BRIEF DESCRIPTION OF THE DRAWINGS

Illustrative embodiments of the disclosed subject matter will hereafter be described referring to the accompanying drawings, wherein like numerals denote like elements.

FIG. 16 compares historical backlog results with validated backlog results computed using the calibration and validation device of FIG. 11 in accordance with an illustrative embodiment.

FIG. 17 compares historical on-hand disbursement results with validated on-hand disbursement results computed using the calibration and validation device of FIG. 11 in accordance with an illustrative embodiment.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
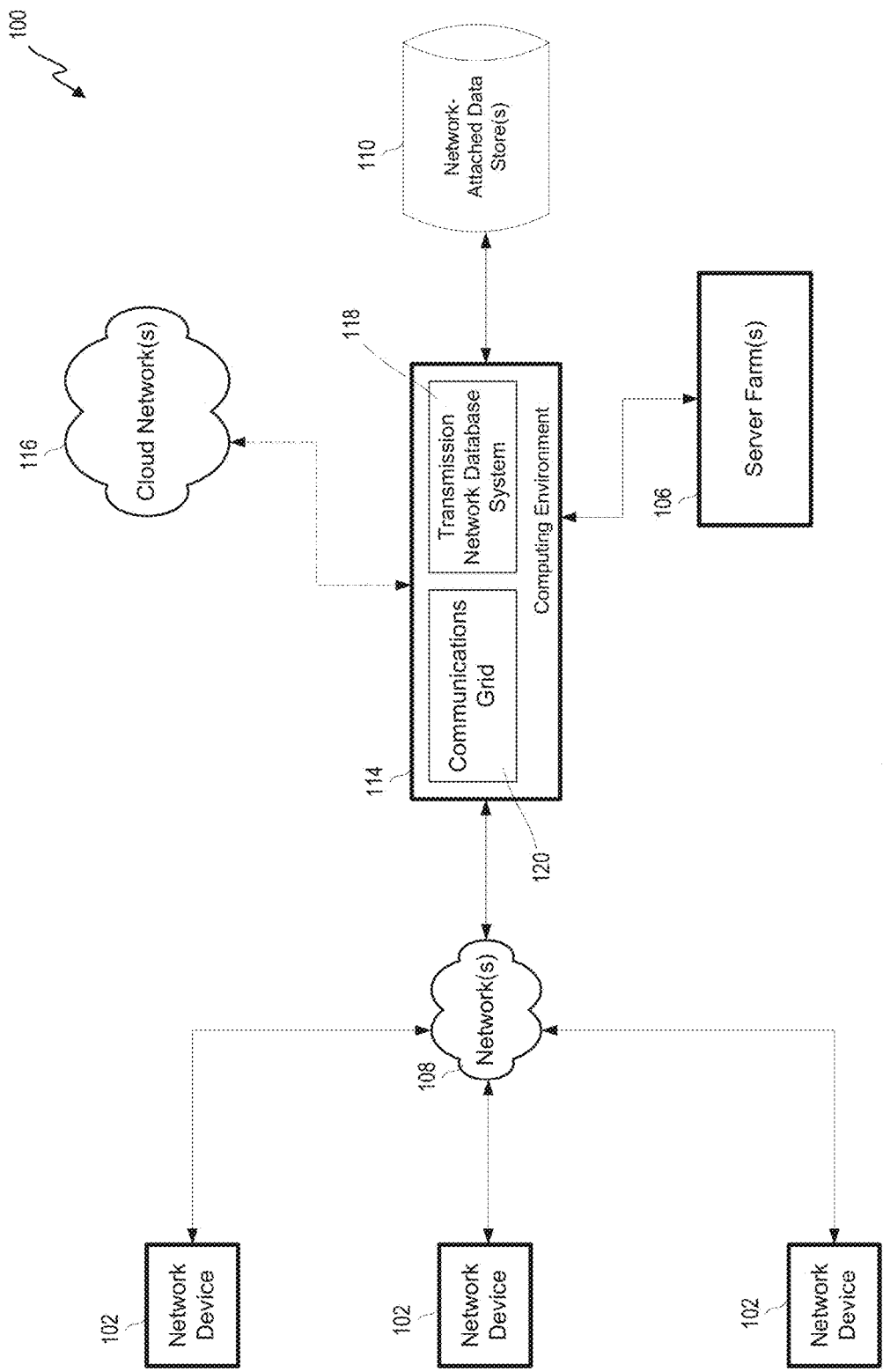
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
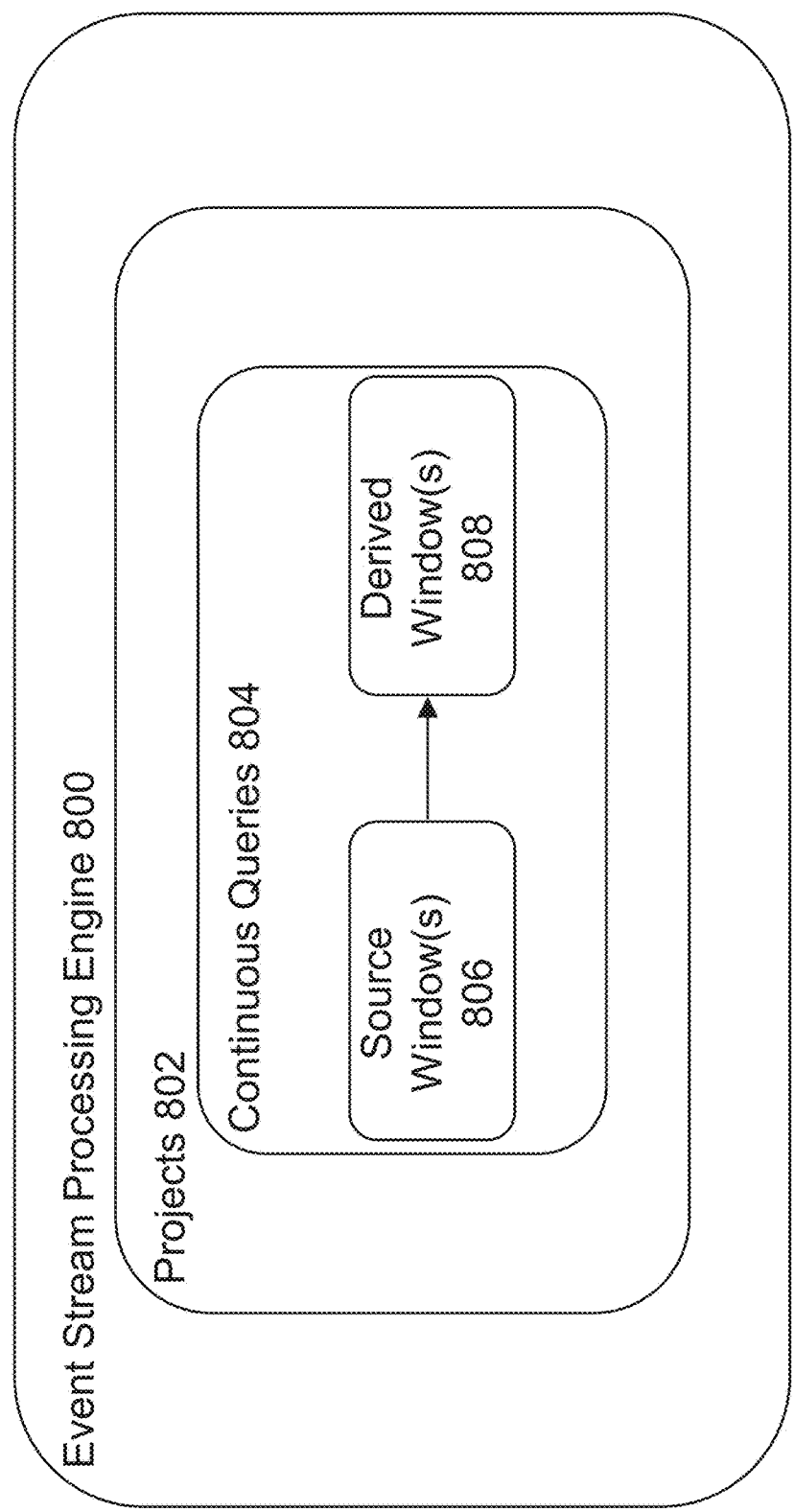
FIG. 8 illustrates a block diagram including components of an Event Stream Processing Engine (ESPE), according to embodiments of the present technology.
Figure 9:
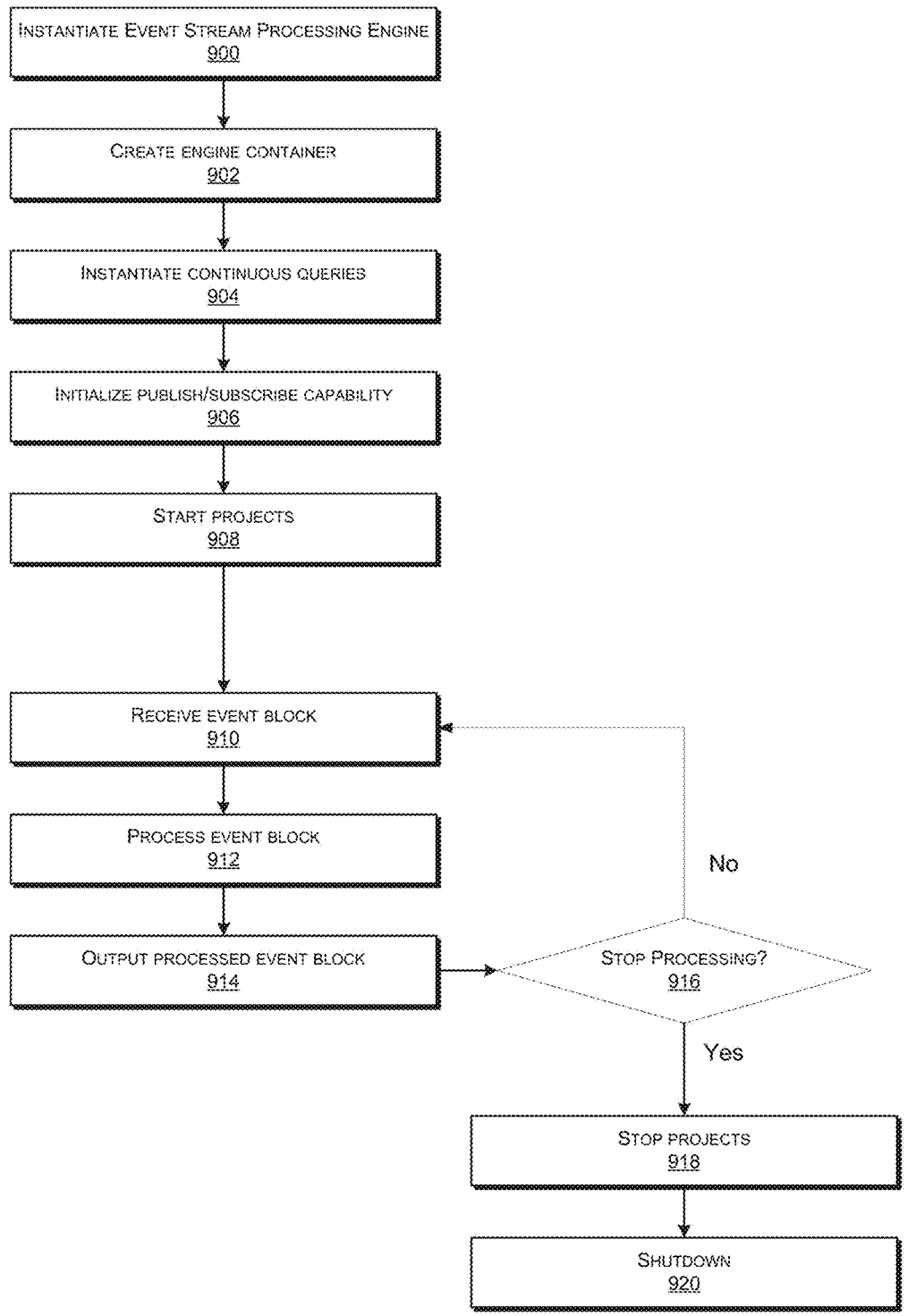
FIG. 9 illustrates a flow chart showing an example process including operations performed by an event stream processing engine, according to some embodiments of the present technology.
Figure 10:
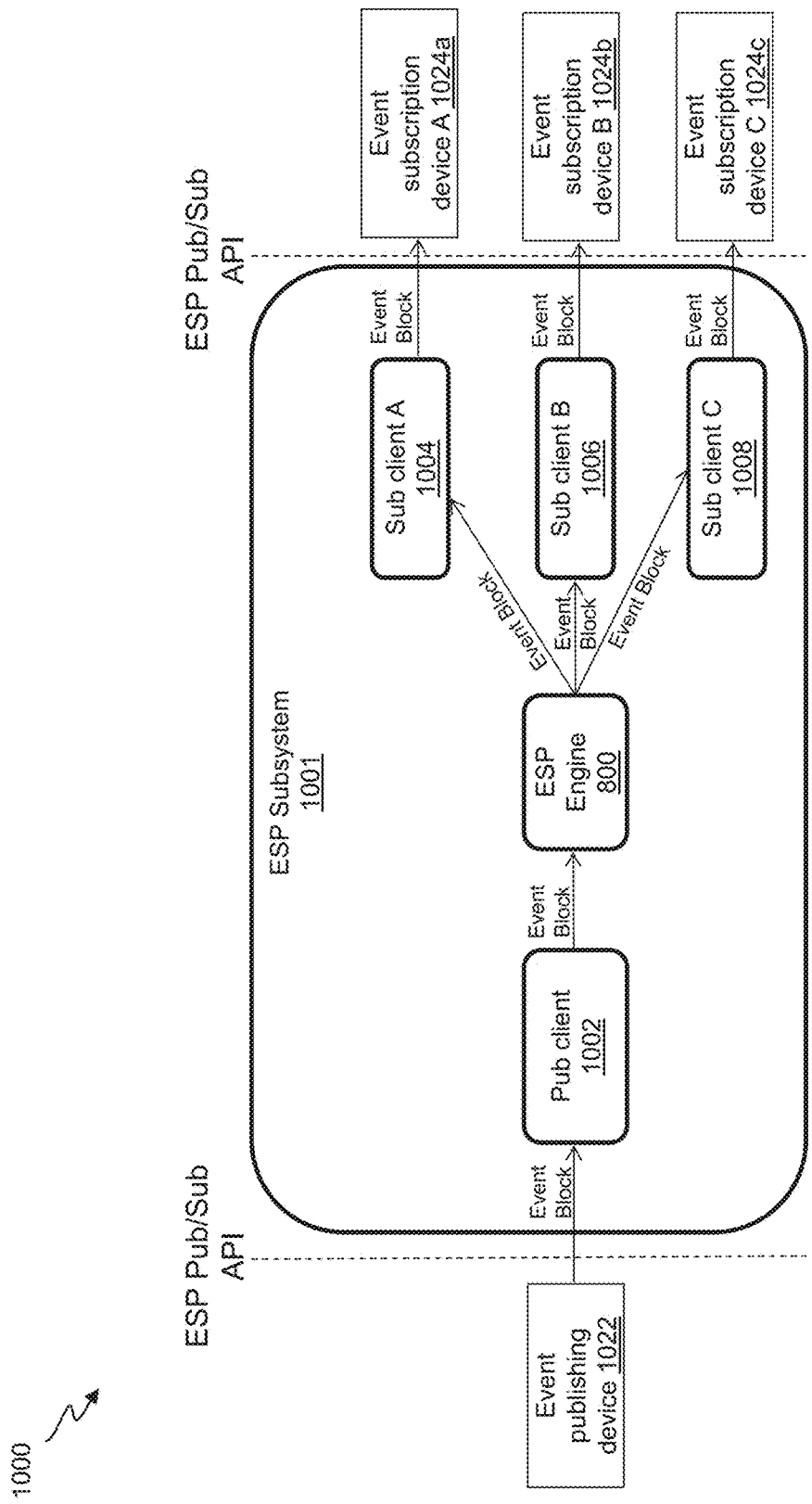
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
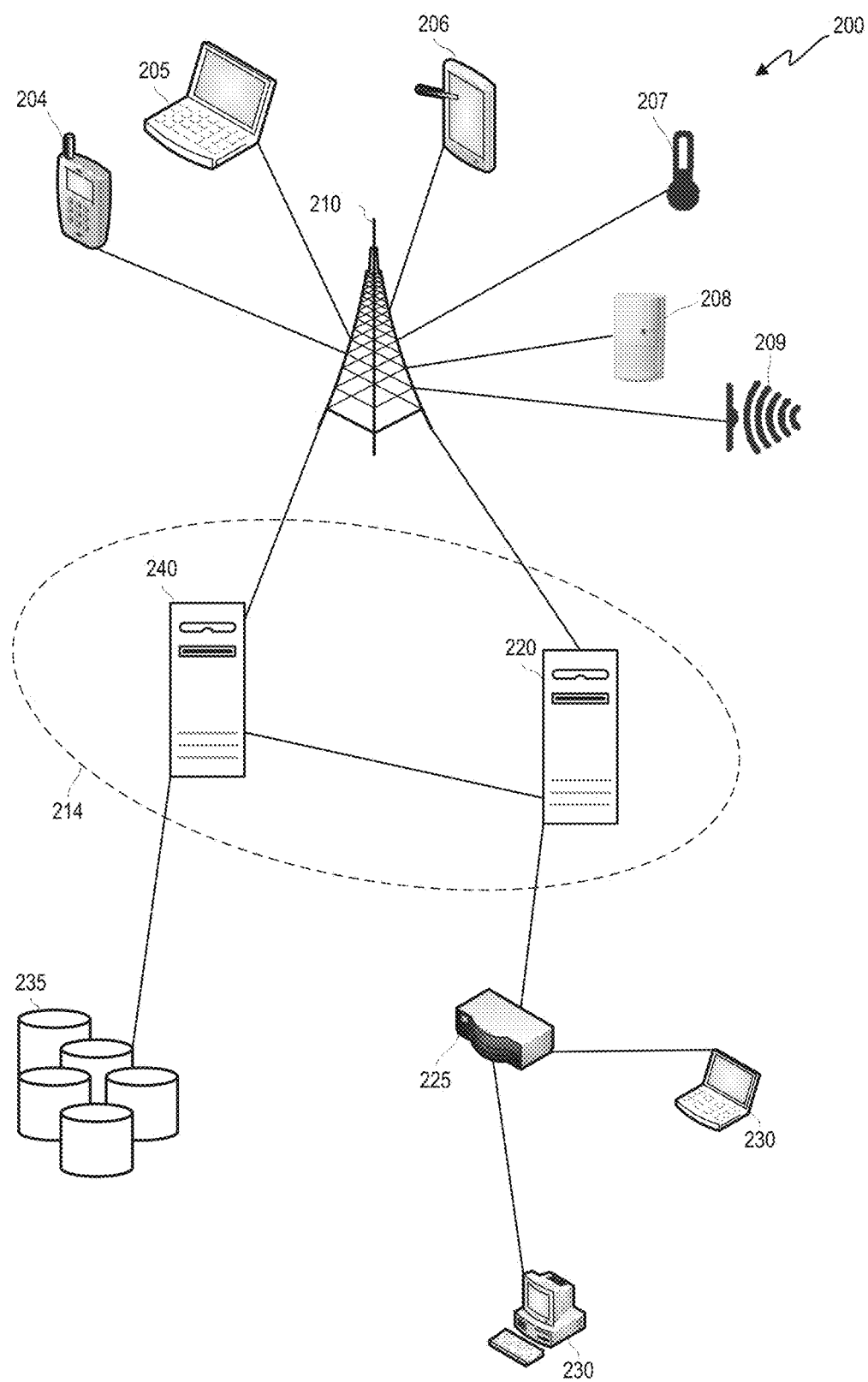
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
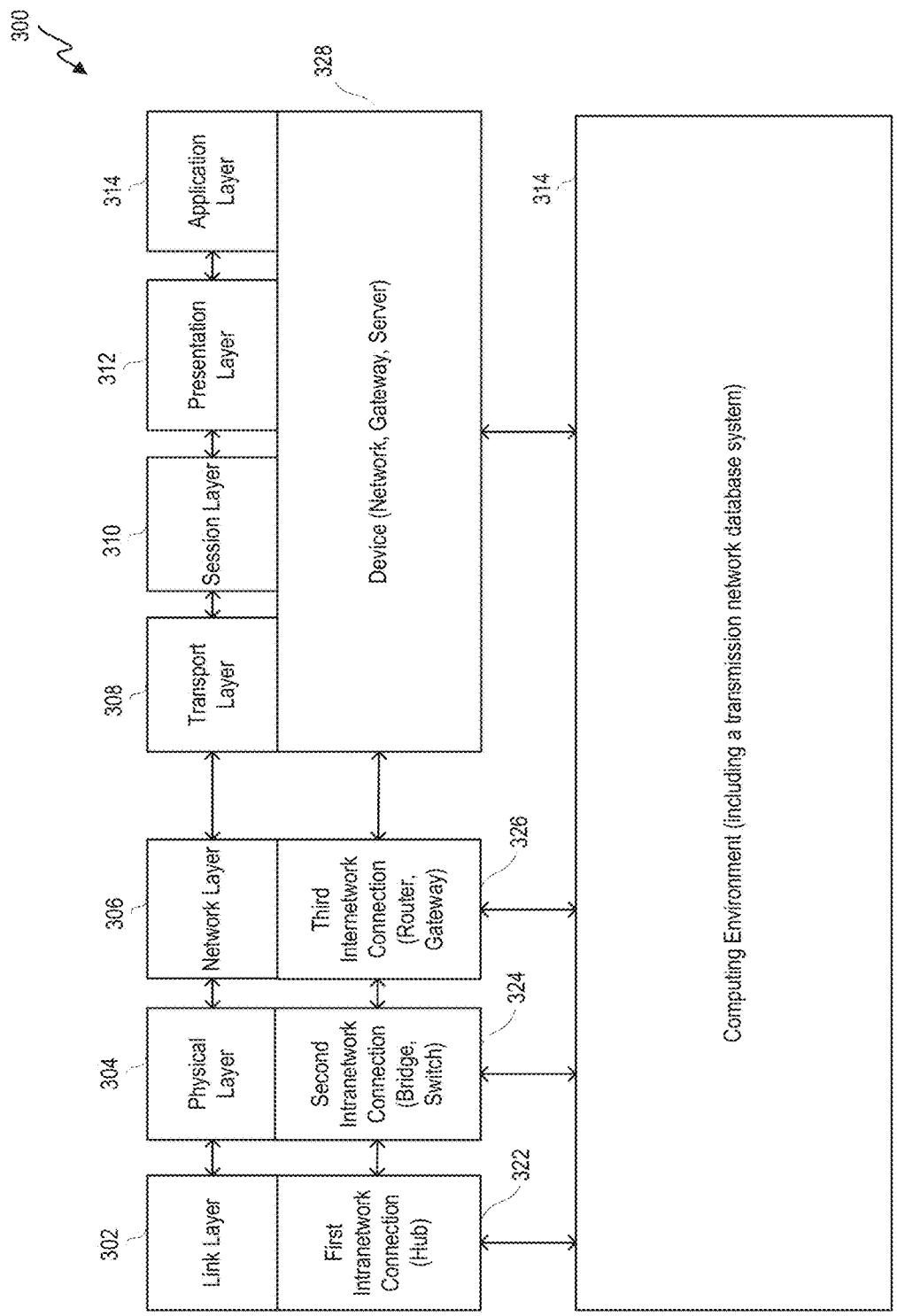
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
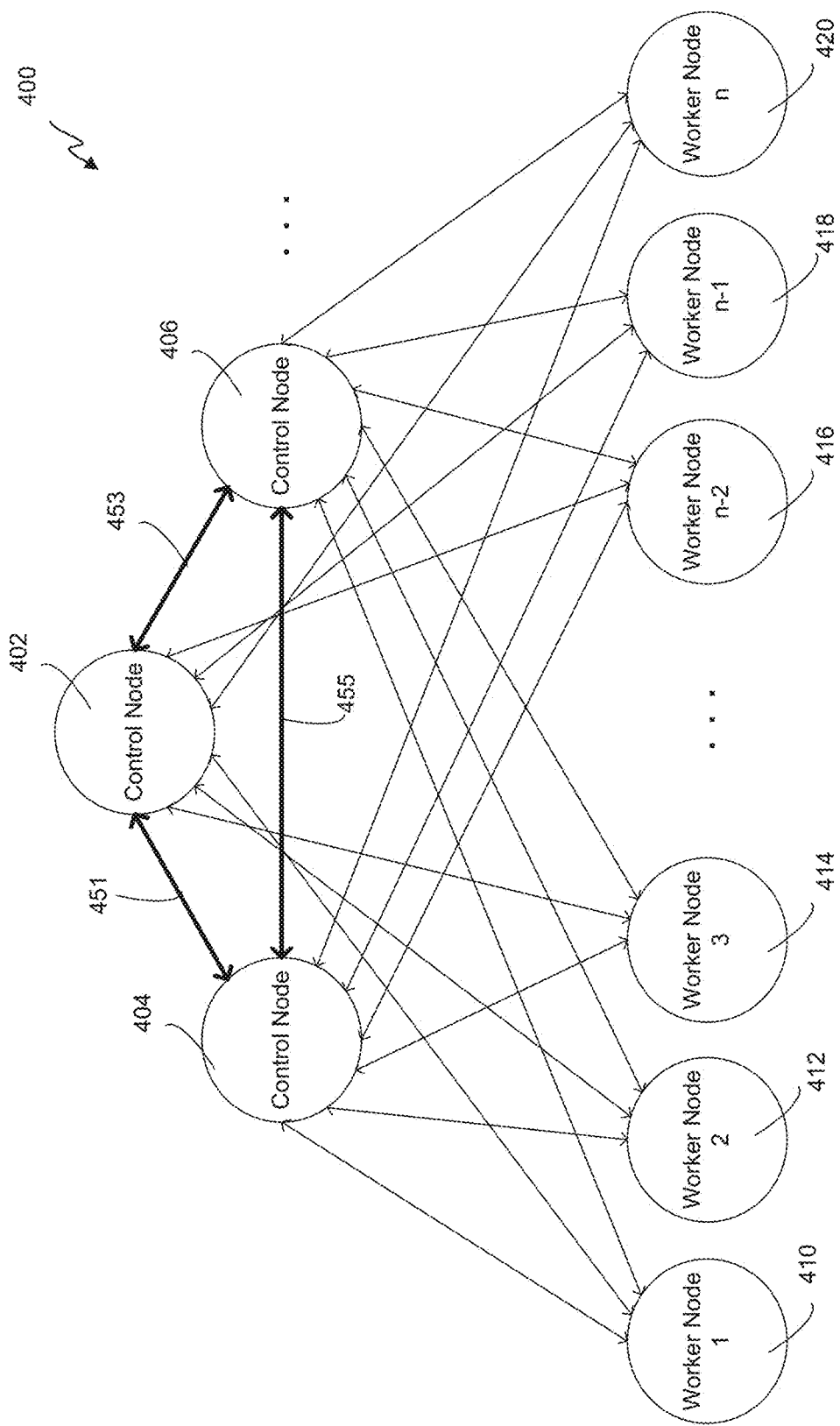
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
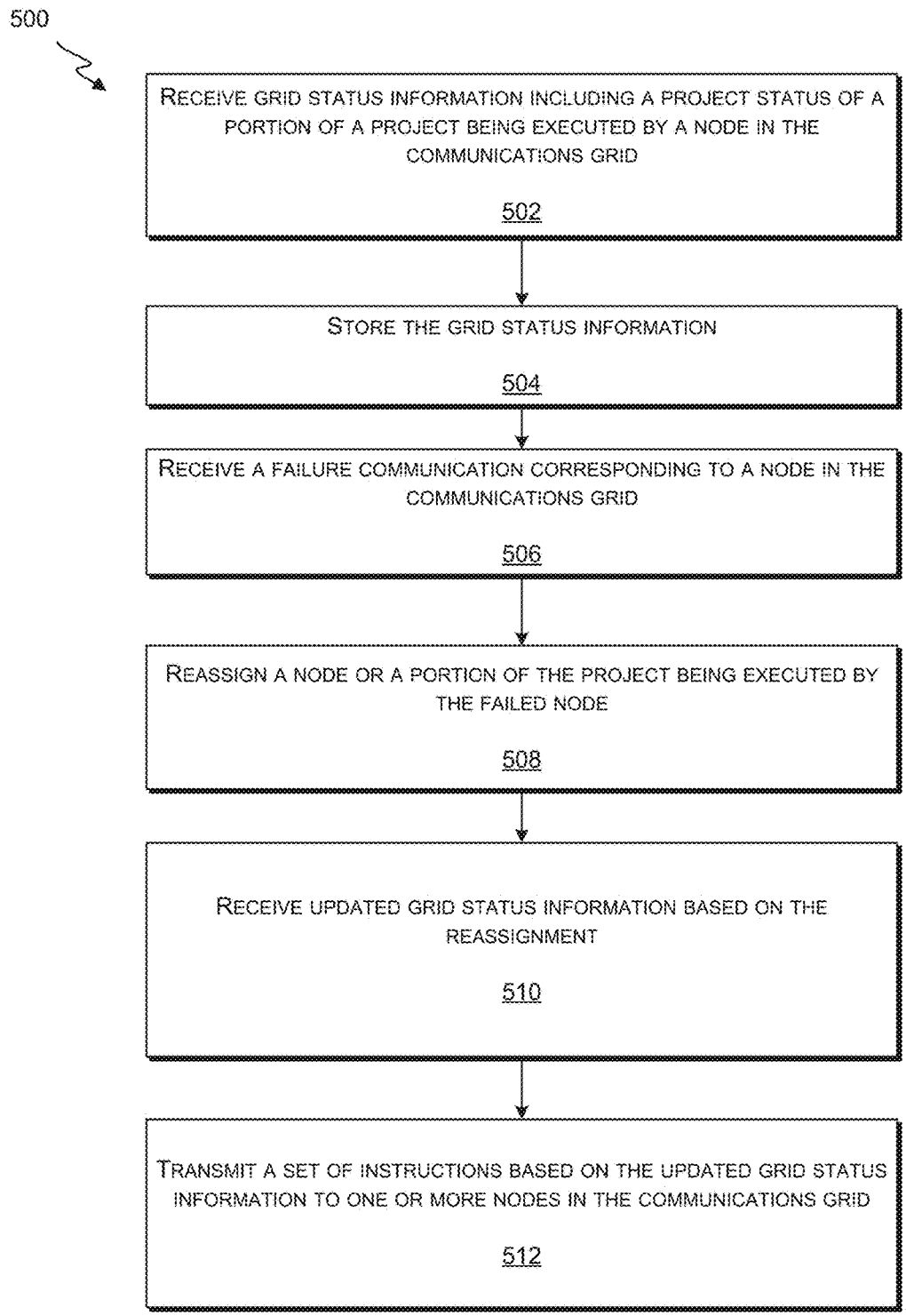
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
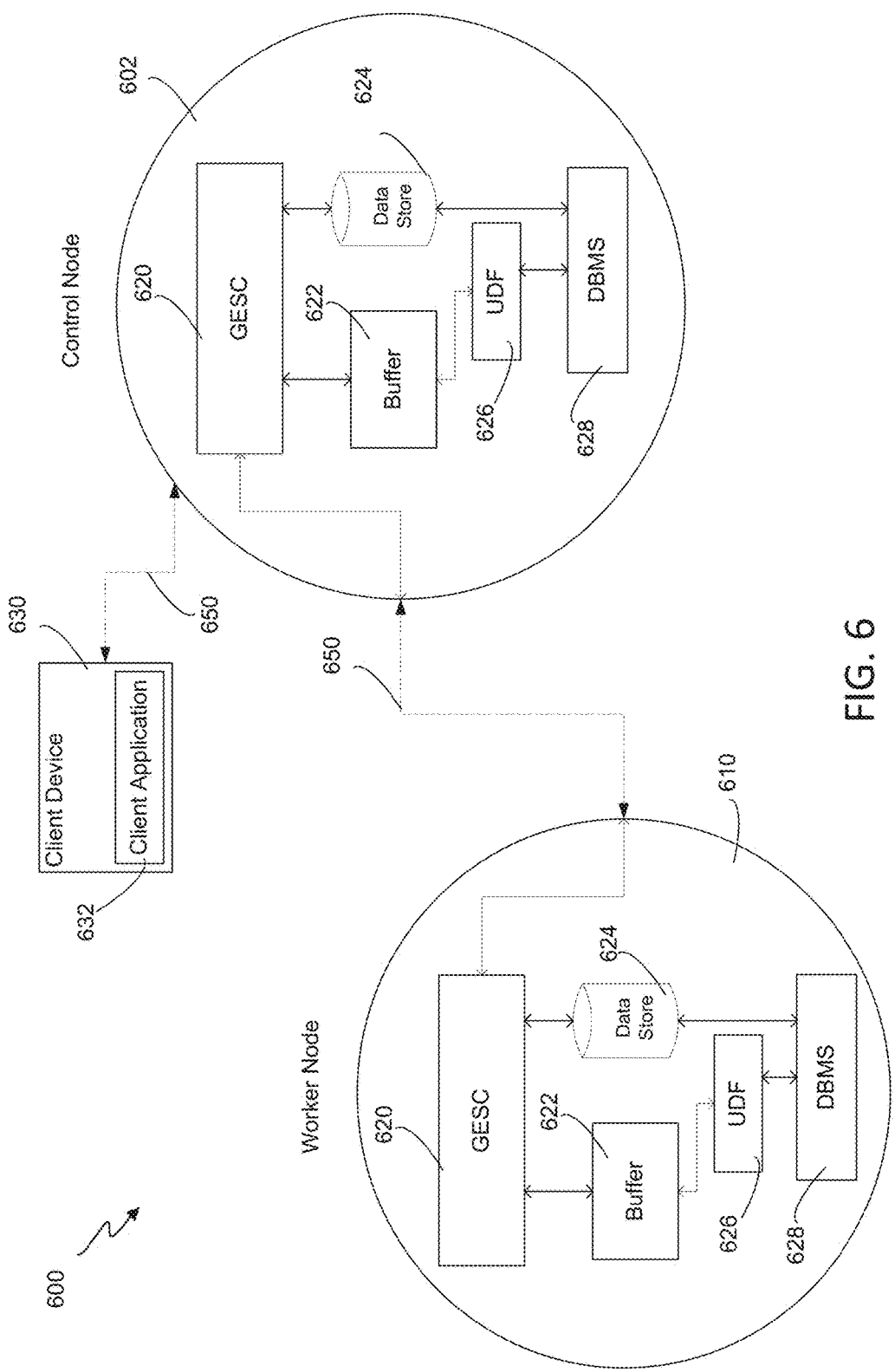
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
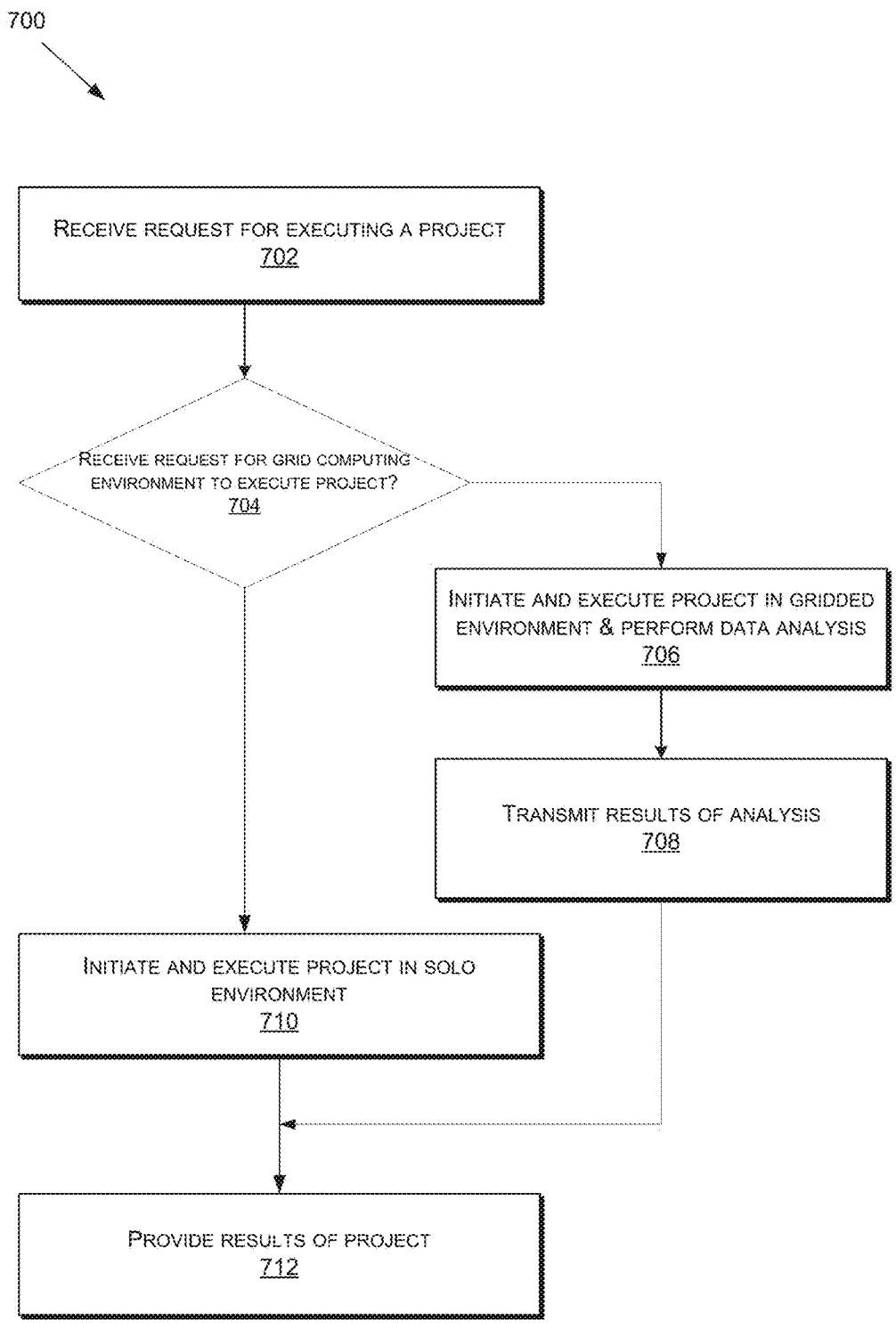
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an ESPE may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when ESP event blocks. The system includes, but is not limited to, an out-messaging network device and a computing device. The computing device includes, but is not limited to, a processor and a computer-readable medium operably coupled to the processor. The processor is configured to execute an ESPE. The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
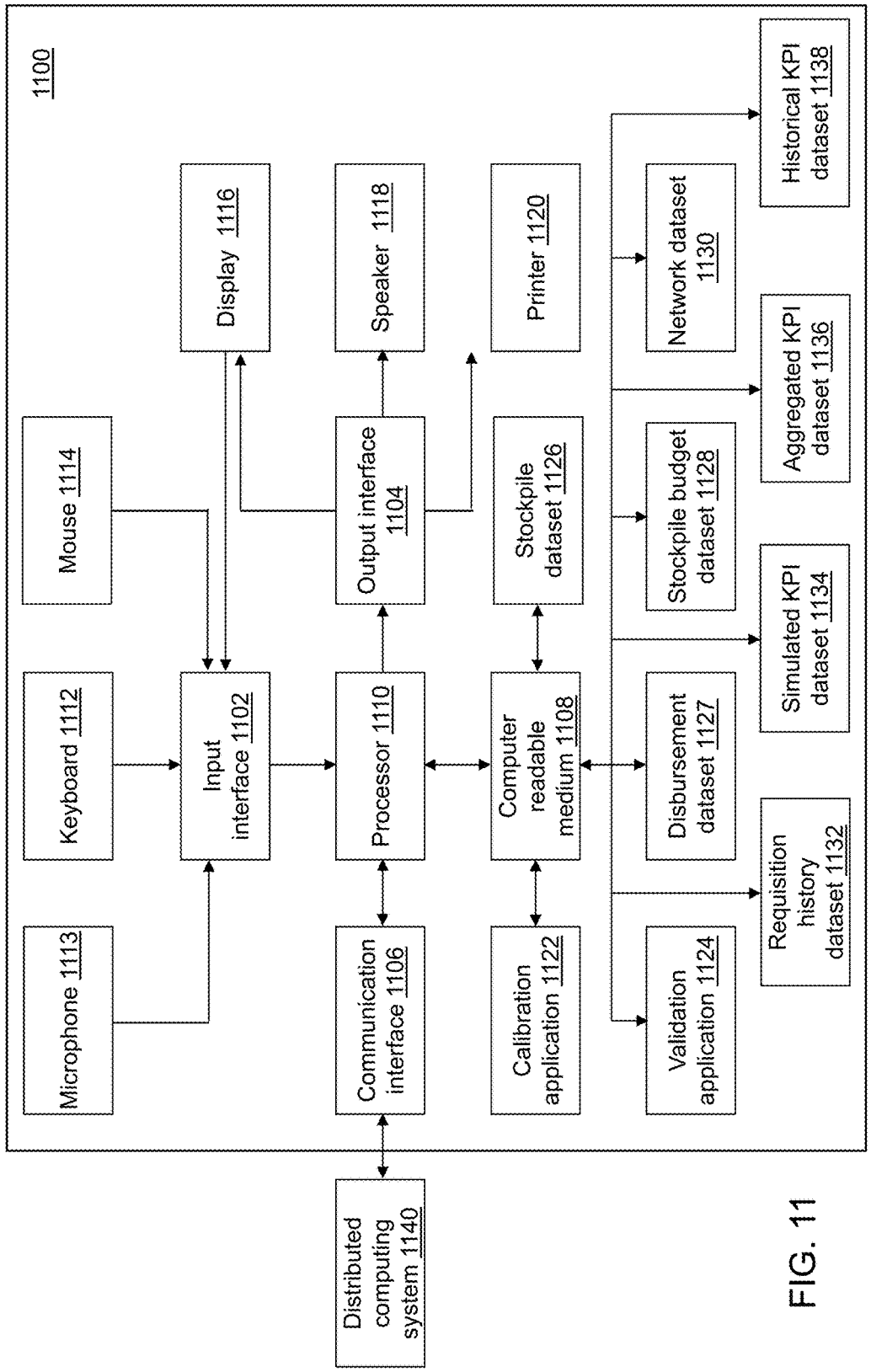
FIG. 11 depicts a block diagram of a calibration and validation device in accordance with an illustrative embodiment.

Referring to FIG. 11, a block diagram of a calibration and validation device 1100 is shown in accordance with an illustrative embodiment. Calibration and validation device 1100 may include an input interface 1102, an output interface 1104, a communication interface 1106, a non-transitory computer-readable medium 1108, a processor 1110, a calibration application 1122, a validation application 1124, a stockpile dataset 1126, a disbursement dataset 1127, a stockpile budget dataset 1128, a network dataset 1130, a requisition history dataset 1132, a simulated key performance indicator (KPI) dataset 1134, an aggregated KPI dataset 1136, and historical KPI dataset 1138. Fewer, different, and/or additional components may be incorporated into calibration and validation device 1100. For example, data stored in stockpile dataset 1126, stockpile budget dataset 1128, network dataset 1130, requisition history dataset 1132, simulated KPI dataset 1134, aggregated KPI dataset 1136, and historical KPI dataset 1138 may be distributed differently between a fewer or a greater number of datasets. As another example, calibration application 1122 and validation application 1124 may be a single application. For illustration, a stockpile can be an inventory; a disbursement can be a product cost; a requisition can be an order; an amount can be a cost; and a network can be a supply chain network.

Input interface 1102 provides an interface for receiving information from the user or another device for entry into calibration and validation device 1100 as understood by those skilled in the art. Input interface 1102 may interface with various input technologies including, but not limited to, a keyboard 1112, a microphone 1113, a mouse 1114, a display 1116, a track ball, a keypad, one or more buttons, etc. to allow the user to enter information into calibration and validation device 1100 or to make selections presented in a user interface displayed on display 1116. The same interface may support both input interface 1102 and output interface 1104. For example, display 1116 comprising a touch screen provides a mechanism for user input and for presentation of output to the user. Calibration and validation device 1100 may have one or more input interfaces that use the same or a different input interface technology. The input interface technology further may be accessible by calibration and validation device 1100 through communication interface 1106.

Output interface 1104 provides an interface for outputting information for review by a user of calibration and validation device 1100 and/or for use by another application or device. For example, output interface 1104 may interface with various output technologies including, but not limited to, display 1116, a speaker 1118, a printer 1120, etc. Calibration and validation device 1100 may have one or more output interfaces that use the same or a different output interface technology. The output interface technology further may be accessible by calibration and validation device 1100 through communication interface 1106.

Communication interface 1106 provides an interface for receiving and transmitting data between devices using various protocols, transmission technologies, and media as understood by those skilled in the art. Communication interface 1106 may support communication using various transmission media that may be wired and/or wireless. Calibration and validation device 1100 may have one or more communication interfaces that use the same or a different communication interface technology. For example, calibration and validation device 1100 may support communication using an Ethernet port, a Bluetooth antenna, a telephone jack, a USB port, etc. Data and messages may be transferred between calibration and validation device 1100 and distributed computing system 1140 using communication interface 1106.

Computer-readable medium 1108 is an electronic holding place or storage for information so the information can be accessed by processor 1110 as understood by those skilled in the art. Computer-readable medium 1108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Calibration and validation device 1100 may have one or more computer-readable media that use the same or a different memory media technology. For example, computer-readable medium 1108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Calibration and validation device 1100 also may have one or more drives that support the loading of a memory media such as a CD, DVD, an external hard drive, etc. One or more external hard drives further may be connected to calibration and validation device 1100 using communication interface 1106.

Processor 1110 executes instructions as understood by those skilled in the art. The instructions may be carried out by a special purpose computer, logic circuits, or hardware circuits. Processor 1110 may be implemented in hardware and/or firmware. Processor 1110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 1110 operably couples with input interface 1102, with output interface 1104, with communication interface 1106, and with computer-readable medium 1108 to receive, to send, and to process information. Processor 1110 may retrieve a set of instructions from a permanent memory device and copy the instructions in an executable form to a temporary memory device that is generally some form of RAM. Calibration and validation device 1100 may include a plurality of processors that use the same or a different processing technology.

Monitoring KPIs for a product supply chain, such as an on-hand disbursement value, a backlog value, a ready rate value, a fill rate value, a back order ratio value, etc., plays a key role in the continuous improvement of the product supply chain to optimize stockpile. The on-hand disbursement value is calculated as a multiplication of a stockpile quantity and a product (or item) amount. The backlog value is defined as a portion of customer orders that cannot be fulfilled from available stockpile. The ready rate value is a probability of not running out of stock at an end of a period. The ready rate value is measured as a ratio between a number of periods with positive on-hand stockpile and a total number of periods. The fill rate value is a percentage of demand that can be satisfied immediately by on-hand stockpile. The back order ratio value is a ratio between an average backorder at an end of a period and an average demand for the period.

There are two key challenges in stockpile optimization in a multi-echelon network that right-sizes a stockpile and that satisfies a desired customer service level: (1) estimating safety stock, and (2) quantifying the benefits expected from stockpile optimization. Safety stock represents the amount of stockpile required to cover an uncertainty in demand data. An optimal stockpile target is a sum of the safety stock and a forecasted demand over lead time. A coefficient of variation (CV), which is defined as a ratio of a standard deviation (squared root of a variance) of demand and an average of the demand, and a service level (SL), which is defined as a measure of a performance of a stockpile replenishment policy, are two critical parameters that may be used to estimate safety stock.

Calibration application 1122 performs operations associated with selecting a stockpile parameter value that is calibrated to estimate a safety stock using stockpile dataset 1126, disbursement dataset 1127, network dataset 1130, requisition history dataset 1132, etc. The calibrated stockpile parameter value, for example, may be a calibrated CV, which is defined as a ratio of a forecast's standard deviation and mean value, and/or a calibrated SL, which is defined as a measure of a performance of a stockpile replenishment policy. Some or all of the operations described herein may be embodied in calibration application 1122.

Referring to the example embodiment of FIG. 11, calibration application 1122 is implemented in software (comprised of computer-readable and/or computer-executable instructions) stored in computer-readable medium 1108 and accessible by processor 1110 for execution of the instructions that embody the operations of calibration application 1122. Calibration application 1122 may be written using one or more programming languages, assembly languages, scripting languages, etc. Calibration application 1122 may be integrated with validation application 1124. Merely for illustration, calibration application 1122 may be implemented using or integrated with one or more SAS software tools such as Base SAS, SAS® Enterprise Miner™, SAS/STAT®, SAS® High Performance Analytics Server, SAS® LASR™ SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. Calibration application 1122 further may be stored and executed on one or more devices of distributed computing system 1140 instead of, or in addition to, storage and execution on calibration and validation device 1100.

Calibration application 1122 may be implemented as a Web application. For example, calibration application 1122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Validation application 1124 performs operations associated with validating the calibrated stockpile parameter value selected using calibration application 1122 to verify that the value selected is configured correctly using network dataset 1130, requisition history dataset 1132, etc. and to quantify the resulting benefit that may result when stockpile optimization is used for decision making. Merely for illustration, validation application 1124 may be implemented using or integrated with one or more SAS software tools such as Base SAS, SAS® Enterprise Miner™, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. Some or all of the operations described herein may be embodied in validation application 1124.

Referring to the example embodiment of FIG. 11, validation application 1124 is implemented in software (comprised of computer-readable and/or computer-executable instructions) stored in computer-readable medium 1108 and accessible by processor 1110 for execution of the instructions that embody the operations of validation application 1124. Validation application 1124 may be written using one or more programming languages, assembly languages, scripting languages, etc. Validation application 1124 further may be stored and executed on one or more devices of distributed computing system 1140 instead of, or in addition to, storage and execution on calibration and validation device 1100. Validation application 1124 may be implemented as a Web application.

Calibration application 1122 and validation application 1124 may be the same or different applications or part of an integrated, distributed application supporting some or all of the same types of functionality as described herein. As an example, calibration application 1122 and validation application 1124 may be part of an integrated data analytics software application and/or software architecture such as that offered by SAS Institute Inc. of Cary, N.C., USA.

Stockpile 1126 includes historical data that captures stockpile usage over time. Data in stockpile dataset 1126 may be used to compute an historical stockpile amount data. Data stored in stockpile dataset 1126 may include a product identifier, a location identifier of the product, a period identifier, and a product quantity. The period identifier defines a frequency of capture of the stockpile data. For example, the period identifier may indicate hourly, daily, weekly, monthly, etc. with weekly being the most commonly used period identifier.

The data stored in stockpile dataset 1126 may be generated by and/or captured from a variety of sources including one or more sensors of the same or different type, one or more computing devices, etc. The data stored in stockpile dataset 1126 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Stockpile dataset 1126 may be stored on computer-readable medium 1108 or on one or more computer-readable media of distributed computing system 1140 and accessed by calibration and validation device 1100 using communication interface 1106, input interface 1102, and/or output interface 1104. Data stored in stockpile dataset 1126 may be sensor measurements or signal values captured by a sensor, may be generated or captured in response to occurrence of an event or a transaction, generated by a device such as in response to an interaction by a user with the device, etc. The data stored in stockpile dataset 1126 may be captured at different date/time points periodically, intermittently, when an event occurs, etc. Each record of stockpile dataset 1126 may include one or more date values and/or time values.

Stockpile dataset 1126 may include data captured at a high data rate such as 200 or more observations per second for one or more physical objects. For example, data stored in stockpile dataset 1126 may be generated as part of the Internet of Things (IoT), where things (e.g., machines, devices, phones, sensors) can be connected to networks and the data from these things collected and processed within the things and/or external to the things before being stored in stockpile dataset 1126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Some data may be processed with an event stream processing engine (ESPE), which may reside in the cloud or in an edge device before being stored in stockpile dataset 1126.

Stockpile dataset 1126 may be stored using various structures as known to those skilled in the art including one or more files of a file system, a relational database, one or more tables of a system of tables, a structured query language database, etc. on calibration and validation device 1100 or on distributed computing system 1140. Calibration and validation device 1100 may coordinate access to stockpile dataset 1126 that is distributed across of distributed computing system 1140 that may include one or more computing devices. For example, stockpile dataset 1126 may be stored in a cube distributed across a grid of computers as understood by a person of skill in the art. As another example, stockpile dataset 1126 may be stored in a multi-node Hadoop® cluster. For instance, Apache™ Hadoop® is an open-source software framework for distributed computing supported by the Apache Software Foundation. As another example, stockpile dataset 1126 may be stored in a cloud of computers and accessed using cloud computing technologies, as understood by a person of skill in the art. The SAS® LASR™ Analytic Server may be used as an analytic platform to enable multiple users to concurrently access data stored in stockpile dataset 1126. The SAS® Viya™ open, cloud-ready, in-memory architecture also may be used as an analytic platform to enable multiple users to concurrently access data stored in stockpile dataset 1126. Some systems may use SAS In-Memory Statistics for Hadoop® to read big data once and analyze it several times by persisting it in-memory for the entire session. Some systems may be of other types and configurations.

Disbursement dataset 1127 includes historical data that captures disbursement data over time. Data in disbursement dataset 1127 may be used to compute the historical stockpile amount data. Data stored in disbursement dataset 1127 may include a product identifier, a location identifier of the product, and a product amount.

The data stored in disbursement dataset 1127 may be generated by and/or captured from a variety of sources including one or more sensors of the same or different type, one or more computing devices, etc. The data stored in disbursement dataset 1127 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Disbursement dataset 1127 may be stored on computer-readable medium 1108 or on one or more computer-readable media of distributed computing system 1140 and accessed by calibration and validation device 1100 using communication interface 1106, input interface 1102, and/or output interface 1104. Data stored in disbursement dataset 1127 may be sensor measurements or signal values captured by a sensor, may be generated or captured in response to occurrence of an event or a transaction, generated by a device such as in response to an interaction by a user with the device, etc. The data stored in disbursement dataset 1127 may be captured at different date/time points periodically, intermittently, when an event occurs, etc. Each record of disbursement dataset 1127 may include one or more date values and/or time values.

Disbursement dataset 1127 may include data captured at a high data rate such as 200 or more observations per second for one or more physical objects. For example, data stored in disbursement dataset 1127 may be generated as part of the IoT before being stored in disbursement dataset 1127. Some data may be processed with an ESPE before being stored in disbursement dataset 1127.

Disbursement dataset 1127 may be stored using various structures as known to those skilled in the art including one or more files of a file system, a relational database, one or more tables of a system of tables, a structured query language database, etc. on calibration and validation device 1100 or on distributed computing system 1140. Calibration and validation device 1100 may coordinate access to disbursement dataset 1127 that is distributed across of distributed computing system 1140 that may include one or more computing devices. For example, disbursement dataset 1127 may be stored in a cube, in a multi-node Hadoop® cluster, in a cloud of computers etc. The SAS® LASR™ Analytic Server, SAS® Viya™ architecture, and/or SAS In-Memory Statistics for Hadoop® may be used as an analytic platform to enable multiple users to concurrently access data stored in disbursement dataset 1127.

Stockpile budget dataset 1128 includes budget data for the stockpile and may be computed from historical stockpile amount data computed from data stored in stockpile dataset 1126 and disbursement dataset 1127. Data stored in disbursement dataset 1127 may include an average historical stockpile amount and a stockpile budget factor value where the stockpile budget can be computed by multiplying the average historical stockpile amount and the percentage of stockpile amount value. The stockpile budget factor value may be any value. For illustration, the stockpile budget factor value of one means that the stockpile budget is based directly on the average historical stockpile amount; the stockpile budget factor value less than one means that the stockpile budget uses less than the average historical stockpile amount; and the stockpile budget factor value greater than one means that the stockpile budget uses greater than the average historical stockpile amount.

As used herein, the data stored in stockpile budget dataset 1128 may include any type of content represented in any computer-readable format such as binary, alphanumeric, numeric, string, markup language, etc. The data may be organized using delimited fields, such as comma or space separated fields, fixed width fields, using a SAS® dataset, etc.

Stockpile budget dataset 1128 may be stored on computer-readable medium 1108 or on one or more computer-readable media of distributed computing system 1140 and accessed by calibration and validation device 1100 using communication interface 1106, input interface 1102, and/or output interface 1104. Stockpile budget dataset 1128 may be stored using various structures as known to those skilled in the art including one or more files of a file system, a relational database, one or more tables of a system of tables, a structured query language database, etc. on calibration and validation device 1100 or on distributed computing system 1140. Calibration and validation device 1100 may coordinate access to stockpile budget dataset 1128 that is distributed across of distributed computing system 1140 that may include one or more computing devices. For example, stockpile budget dataset 1128 may be stored in a cube, in a multi-node Hadoop® cluster, in a cloud of computers etc. The SAS® LASR™ Analytic Server, SAS® Viya™ architecture, and/or SAS In-Memory Statistics for Hadoop® may be used as an analytic platform to enable multiple users to concurrently access data stored in stockpile budget dataset 1128.

Network dataset 1130 describes network structures by defining arcs (linkages) between predecessors and successors in a supply chain for one or more products. The network structures may include nodes that manufacture, assemble, combine, create, etc. an end product from other products. Nodes are associated with a stock keeping unit (SKU)-location of a structure in the network. A SKU is a store's or catalog's product and service identification code, often portrayed as a machine-readable bar code to assist in tracking the item for stockpile. Network dataset 1130 may include a network identifier for each arc; a unit amount per period of stockpile in transit from the predecessor to the successor; a SKU-location of the predecessor of each arc; a SKU-location of the successor of each arc; a bill of material quantity between the predecessor and the successor of each arc, and a holding amount per unit. The holding amount per unit may indicate a amount to store the unit at either or both of the predecessor and the successor. From an analysis perspective, there are two types of locations: locations that face customer demand directly (called "customer-facing locations"), and locations that face replenishment orders from other locations within the network (called "internal locations"). If an arc links a SKU-location with an external supplier, the SKU-location of the predecessor may be set to "external".

As used herein, the data stored in network dataset 1130 may include any type of content represented in any computer-readable format such as binary, alphanumeric, numeric, string, markup language, etc. The data may be organized using delimited fields, such as comma or space separated fields, fixed width fields, using a SAS® dataset, etc. Network dataset 1130 may be stored on computer-readable medium 1108 or on one or more computer-readable media of distributed computing system 1140 and accessed by calibration and validation device 1100 using communication interface 1106, input interface 1102, and/or output interface 1104.

Network dataset 1130 may be stored using various structures as known to those skilled in the art including one or more files of a file system, a relational database, one or more tables of a system of tables, a structured query language database, etc. on calibration and validation device 1100 or on distributed computing system 1140. Calibration and validation device 1100 may coordinate access to network dataset 1130 that is distributed across distributed computing system 1140. For example, network dataset 1130 may be stored in a cube, in a multi-node Hadoop® cluster, in a cloud of computers etc. The SAS® LASR™ Analytic Server, SAS® Viya™ architecture, and/or SAS In-Memory Statistics for Hadoop® may be used as an analytic platform to enable multiple users to concurrently access data stored in network dataset 1130.

Requisition history dataset 1132 may include data that indicates previous and/or current orders for products in the network. Data stored in disbursement dataset 1127 may include a product identifier, a location identifier of the product, a requisition date, a ship date, and a requisition quantity.

The data stored in requisition history dataset 1132 may be generated by and/or captured from a variety of sources including one or more sensors of the same or different type, one or more computing devices, etc. The data stored in requisition history dataset 1132 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc.

Requisition history dataset 1132 may be stored on computer-readable medium 1108 or on one or more computer-readable media of distributed computing system 1140 and accessed by calibration and validation device 1100 using communication interface 1106, input interface 1102, and/or output interface 1104. Data stored in requisition history dataset 1132 may be sensor measurements or signal values captured by a sensor, may be generated or captured in response to occurrence of an event or a transaction, generated by a device such as in response to an interaction by a user with the device, etc. The data stored in requisition history dataset 1132 may be captured at different date/time points periodically, intermittently, when an event occurs, etc. Each record of requisition history dataset 1132 may include one or more date values and/or time values.

Requisition history dataset 1132 may include data captured at a high data rate such as 200 or more observations per second for one or more physical objects. For example, data stored in requisition history dataset 1132 may be generated as part of the IoT. Some data may be processed with the ESPE, which may reside in the cloud or in an edge device before being stored in requisition history dataset 1132.

Requisition history dataset 1132 may be stored using various structures as known to those skilled in the art including one or more files of a file system, a relational database, one or more tables of a system of tables, a structured query language database, etc. on calibration and validation device 1100 or on distributed computing system 1140. Calibration and validation device 1100 may coordinate access to requisition history dataset 1132 that is distributed across of distributed computing system 1140 that may include one or more computing devices. For example, requisition history dataset 1132 may be stored in a cube, in a multi-node Hadoop® cluster, in a cloud of computers, etc. The SAS® LASR™ Analytic Server, SAS® Viya™ architecture, and/or SAS In-Memory Statistics for Hadoop® may be used as an analytic platform to enable multiple users to concurrently access data stored in network dataset 1130.

Simulated KPI dataset 1134 stores KPI data computed using a simulation of the network. Simulated KPI dataset 1134 may include one or more KPI values as a function of time for each node of the network. Illustrative KPI data includes an on-hand disbursement value, a backlog value, a ready rate value, a fill rate value, a back order ratio value.

As used herein, the data stored in simulated KPI dataset 1134 may include any type of content represented in any computer-readable format such as binary, alphanumeric, numeric, string, markup language, etc. The data may be organized using delimited fields, such as comma or space separated fields, fixed width fields, using a SAS® dataset, etc.

Simulated KPI dataset 1134 may be stored on computer-readable medium 1108 or on one or more computer-readable media of distributed computing system 1140 and accessed by calibration and validation device 1100 using communication interface 1106, input interface 1102, and/or output interface 1104. Simulated KPI dataset 1134 may be stored using various structures as known to those skilled in the art including one or more files of a file system, a relational database, one or more tables of a system of tables, a structured query language database, etc. on calibration and validation device 1100 or on distributed computing system 1140. Calibration and validation device 1100 may coordinate access to simulated KPI dataset 1134 that is distributed across of distributed computing system 1140 that may include one or more computing devices. For example, simulated KPI dataset 1134 may be stored in a cube, in a multi-node Hadoop® cluster, in a cloud of computers, etc. The SAS® LASR™ Analytic Server, SAS® Viya™ architecture, and/or SAS In-Memory Statistics for Hadoop® may be used as an analytic platform to enable multiple users to concurrently access data stored in simulated KPI dataset 1134.

Aggregated KPI dataset 1136 stores KPI data aggregated from data stored in simulated KPI dataset 1134. Aggregated KPI dataset 1136 may include one or more KPI values as a function of time aggregated for all of the nodes of the network.

As used herein, the data stored in aggregated KPI dataset 1136 may include any type of content represented in any computer-readable format such as binary, alphanumeric, numeric, string, markup language, etc. The data may be organized using delimited fields, such as comma or space separated fields, fixed width fields, using a SAS® dataset, etc.

Aggregated KPI dataset 1136 may be stored on computer-readable medium 1108 or on one or more computer-readable media of distributed computing system 1140 and accessed by calibration and validation device 1100 using communication interface 1106, input interface 1102, and/or output interface 1104. Aggregated KPI dataset 1136 may be stored using various structures as known to those skilled in the art including one or more files of a file system, a relational database, one or more tables of a system of tables, a structured query language database, etc. on calibration and validation device 1100 or on distributed computing system 1140. Calibration and validation device 1100 may coordinate access to aggregated KPI dataset 1136 that is distributed across of distributed computing system 1140 that may include one or more computing devices. For example, aggregated KPI dataset 1136 may be stored in a cube, in a multi-node Hadoop® cluster, in a cloud of computers, etc. The SAS® LASR™ Analytic Server, SAS® Viya™ architecture, and/or SAS In-Memory Statistics for Hadoop® may be used as an analytic platform to enable multiple users to concurrently access data stored in network dataset 1130.

Historical KPI dataset 1138 captures KPI data computed over a previous time period. As used herein, the data in historical KPI dataset 1138 may include any type of content represented in any computer-readable format such as binary, alphanumeric, numeric, string, markup language, etc. The data may be organized using delimited fields, such as comma or space separated fields, fixed width fields, using a SAS® dataset, etc.

Historical KPI dataset 1138 may be stored on computer-readable medium 1108 or on one or more computer-readable media of distributed computing system 1140 and accessed by calibration and validation device 1100 using communication interface 1106, input interface 1102, and/or output interface 1104. The data stored in historical KPI dataset 1138 may be computed at different date/time points periodically, intermittently, when an event occurs, etc. Each record of historical KPI dataset 1138 may include one or more date values and/or time values.

Historical KPI dataset 1138 may include data computed at a high data rate such as 200 or more observations per second for one or more physical objects. For example, data stored in historical KPI dataset 1138 may be generated as part of the IoT. Some data may be processed with the ESPE, which may reside in the cloud or in an edge device before being stored in requisition history dataset 1132.

Historical KPI dataset 1138 may be stored using various structures as known to those skilled in the art including one or more files of a file system, a relational database, one or more tables of a system of tables, a structured query language database, etc. on calibration and validation device 1100 or on distributed computing system 1140. Calibration and validation device 1100 may coordinate access to historical KPI dataset 1138 that is distributed across of distributed computing system 1140 that may include one or more computing devices. For example, historical KPI dataset 1138 may be stored in a cube, in a multi-node Hadoop® cluster, in a cloud of computers, etc. The SAS® LASR™ Analytic Server, SAS® Viya™ architecture, and/or SAS In-Memory Statistics for Hadoop® may be used as an analytic platform to enable multiple users to concurrently access data stored in network dataset 1130.

Figure 12A:
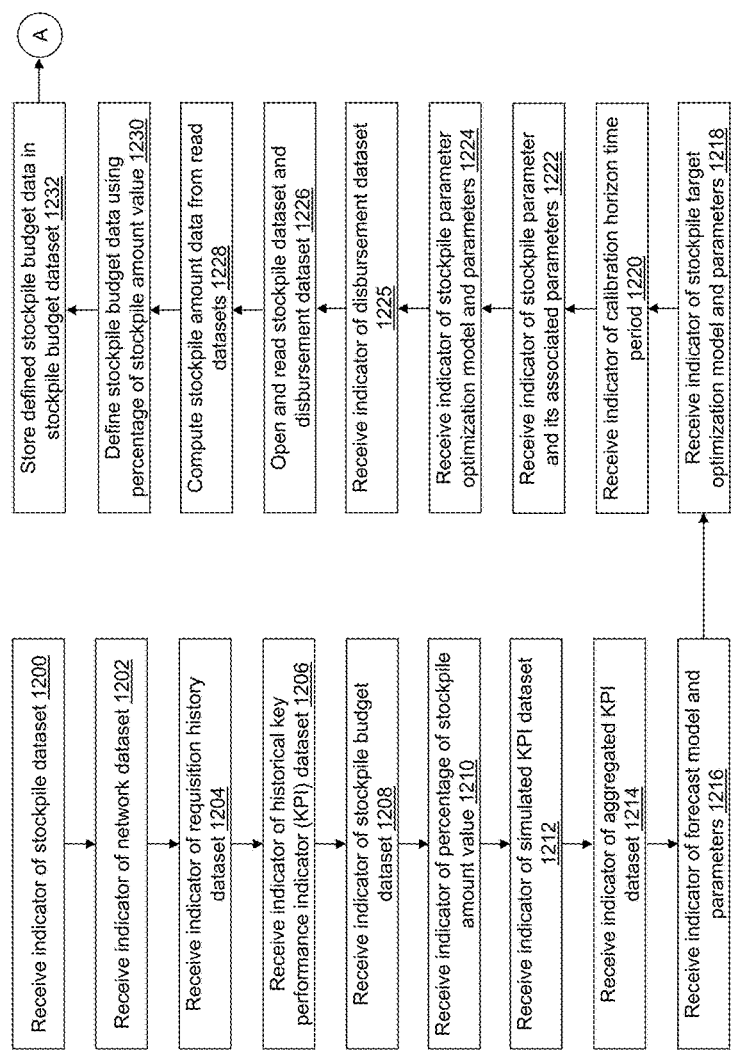
FIGS. 12A, 12B, and 12C depict a flow diagram illustrating examples of operations performed by the calibration and validation device of FIG. 11 in accordance with an illustrative embodiment.
Figure 12B:
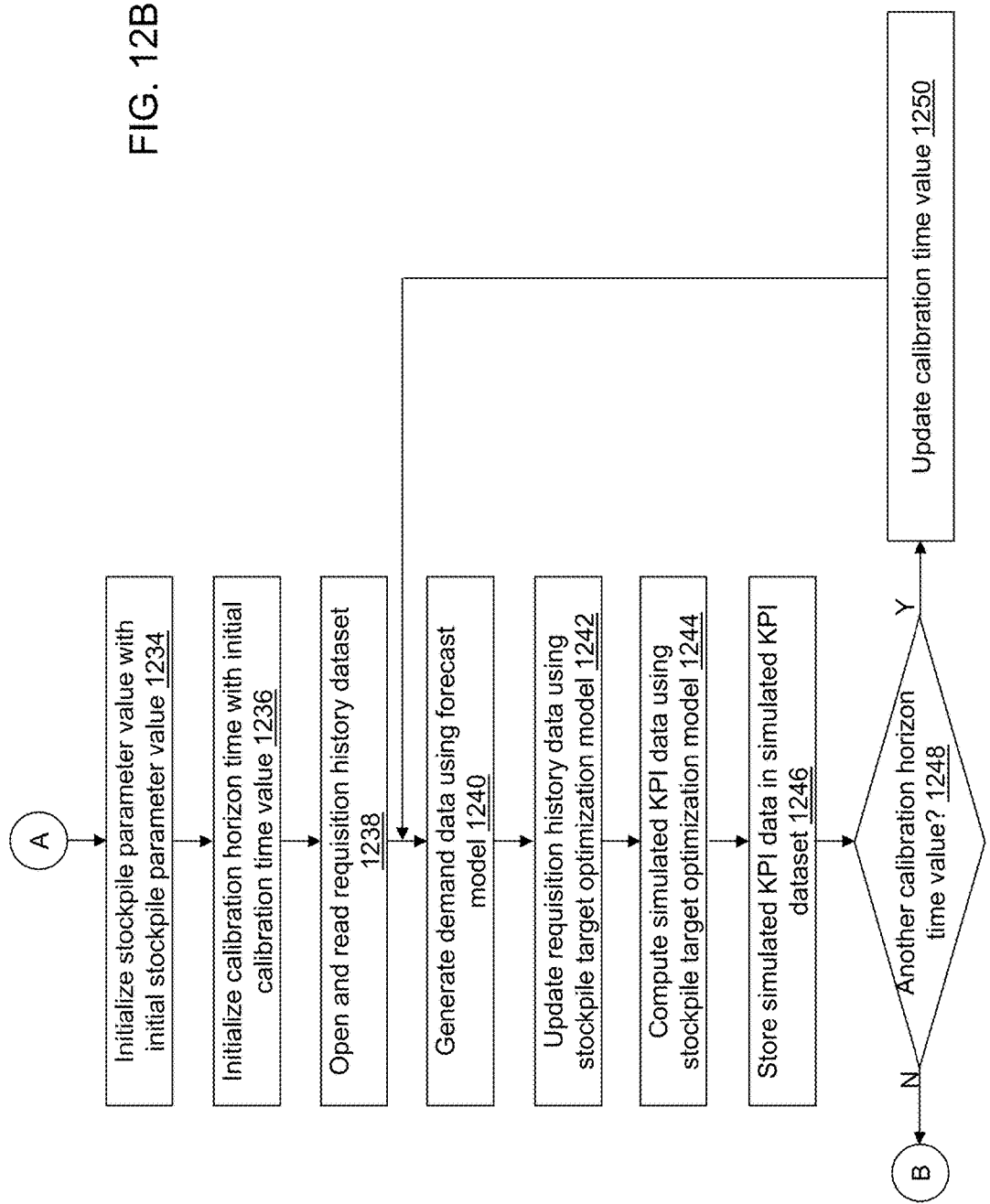
Figure 12C:
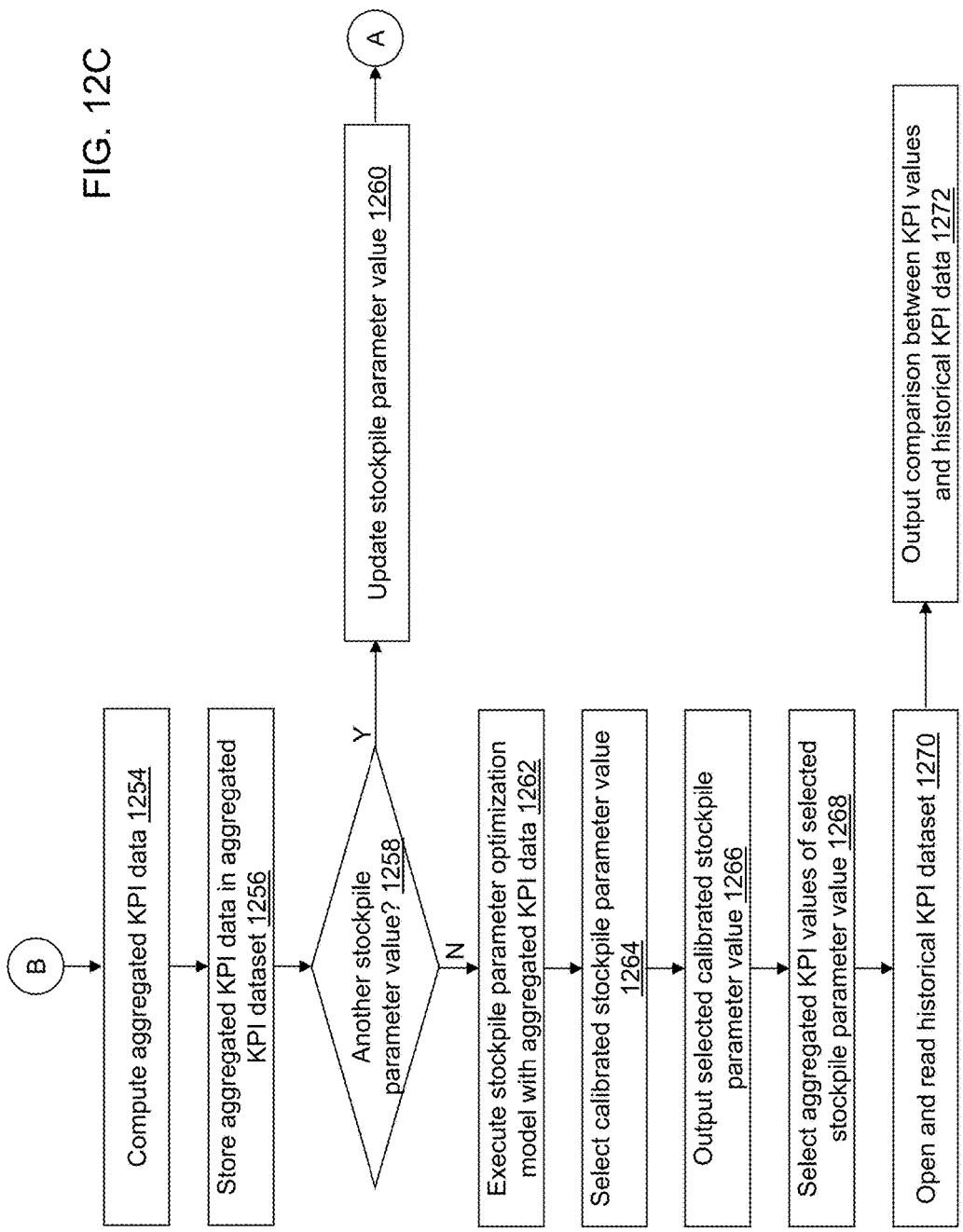

Referring to FIGS. 12A, 12B, and 12C, example operations performed by calibration application 1122 are described. Additional, fewer, or different operations may be performed depending on the embodiment of calibration application 1122. The order of presentation of the operations of FIGS. 12A, 12B, and 12C is not intended to be limiting. Although some of the operational flows are presented in sequence, the various operations may be performed in various repetitions, concurrently (in parallel, for example, using threads and/or distributed computing system 1140), and/or in other orders than those that are illustrated. For example, a user may execute calibration application 1122, which causes presentation of a first user interface window, which may include a plurality of menus and selectors such as drop down menus, buttons, text boxes, hyperlinks, etc. associated with calibration application 1122 as understood by a person of skill in the art. The plurality of menus and selectors may be accessed in various orders. An indicator may indicate one or more user selections from a user interface, one or more data entries into a data field of the user interface, one or more data items read from computer-readable medium 1108 or otherwise defined with one or more default values, etc. that are received as an input by calibration application 1122.

Referring to FIG. 12A, in an operation 1200, a first indicator may be received that indicates stockpile dataset 1126. For example, the first indicator indicates a location and a name of stockpile dataset 1126. As an example, the first indicator may be received by calibration application 1122 after selection from a user interface window or after entry by a user into a user interface window. In an alternative embodiment, stockpile dataset 1126 may not be selectable. For example, a most-recently created dataset may be used automatically. As another example, a default location and name may be stored and used for stockpile dataset 1126. The first indicator may indicate a plurality of datasets.

In an operation 1202, a second indicator may be received that indicates network dataset 1130. For example, the second indicator indicates a location and a name of network dataset 1130. As an example, the second indicator may be received by calibration application 1122 after selection from a user interface window or after entry by a user into a user interface window. In an alternative embodiment, network dataset 1130 may not be selectable. For example, a most-recently created dataset may be used automatically. As another example, a default location and name may be stored and used for network dataset 1130. The second indicator may indicate a plurality of datasets.

In an operation 1204, a third indicator may be received that indicates requisition history dataset 1132. For example, the third indicator indicates a location and a name of requisition history dataset 1132. As an example, the third indicator may be received by calibration application 1122 after selection from a user interface window or after entry by a user into a user interface window. In an alternative embodiment, requisition history dataset 1132 may not be selectable. For example, a most-recently created dataset may be used automatically. As another example, a default location and name may be stored and used for requisition history dataset 1132. The third indicator may indicate a plurality of datasets.

In an operation 1206, a fourth indicator may be received that indicates historical KPI dataset 1138. For example, the fourth indicator indicates a location and a name of historical KPI dataset 1138. As an example, the fourth indicator may be received by calibration application 1122 after selection from a user interface window or after entry by a user into a user interface window. In an alternative embodiment, historical KPI dataset 1138 may not be selectable. For example, a most-recently created dataset may be used automatically. As another example, a default location and name may be stored and used for historical KPI dataset 1138. The fourth indicator may indicate a plurality of datasets.

In an operation 1208, a fifth indicator may be received that indicates stockpile budget dataset 1128. For example, the fifth indicator indicates a location and a name of stockpile budget dataset 1128. As an example, the fifth indicator may be received by calibration application 1122 after selection from a user interface window or after entry by a user into a user interface window. In an alternative embodiment, stockpile budget dataset 1128 may not be selectable. For example, a default location and name may be stored and used for stockpile budget dataset 1128. The fifth indicator may indicate a plurality of datasets.

In an operation 1210, a sixth indicator of the stockpile budget factor value may be received. The stockpile budget factor value may be used to compute data stored in stockpile budget dataset 1128 from historical stockpile amount data computed from data stored in stockpile dataset 1126. In an alternative embodiment, the sixth indicator may not be received and/or selectable. For example, a default value may be stored, for example, in computer-readable medium 1108 and used automatically.

In an operation 1212, a seventh indicator may be received that indicates simulated KPI dataset 1134. For example, the seventh indicator indicates a location and a name of simulated KPI dataset 1134. As an example, the seventh indicator may be received by calibration application 1122 after selection from a user interface window or after entry by a user into a user interface window. In an alternative embodiment, simulated KPI dataset 1134 may not be selectable. For example, a default location and name may be stored and used for simulated KPI dataset 1134. The seventh indicator may indicate a plurality of datasets.

In an operation 1214, an eighth indicator may be received that indicates aggregated KPI dataset 1136. For example, the eighth indicator indicates a location and a name of aggregated KPI dataset 1136. As an example, the eighth indicator may be received by calibration application 1122 after selection from a user interface window or after entry by a user into a user interface window. In an alternative embodiment, aggregated KPI dataset 1136 may not be selectable. For example, a default location and name may be stored and used for aggregated KPI dataset 1136. The eighth indicator may indicate a plurality of datasets.

In an operation 1216, a ninth indicator of a forecast model to apply may be received with values of any parameters that may be used to control, effect, or otherwise define execution of the indicated forecast model. The forecast model is used to forecast a demand for stockpile based on data stored in requisition history dataset 1132. Of course, the values of any parameters may be received separately or may be defined using default values. For example, the ninth indicator indicates a name of the forecast model or method. The ninth indicator may be received by calibration application 1122 after selection from a user interface window or after entry by a user into a user interface window. A default value for the forecast model may further be stored, for example, in computer-readable medium 1108.

As an example, the forecast model may be selected from "Simple", "Double", "Linear", "Damped Trend", "Add Seasonal", "Multi-Seasonal", "Winters", "Add Winters", "Best Smooth", "Best Seasonal Smooth", "Best", "ARIMA", and "Unobserved Component", etc. For example, a default forecast model may be the "Best" forecast model. Of course, the forecast model may be labeled or selected in a variety of different manners by the user as understood by a person of skill in the art. In an alternative embodiment, the forecast model may not be selectable, and a single forecast model is implemented by calibration application 1122. For illustration, a default forecast model may be the HPF Procedure included with SAS® Forecast Server. The "Best" forecast model used with the HPF Procedure may be used by default or without allowing a selection.

For illustration, the "Simple" forecast model may use simple exponential smoothing; the "Double" forecast model may use double exponential smoothing; the "Linear" forecast model may use linear exponential smoothing; the "Damped Trend" forecast model may use damped trend exponential smoothing; the "Add Seasonal" forecast model may use additive seasonal exponential smoothing; the "Multi-Seasonal" forecast model may use multiplicative seasonal exponential smoothing; the "Winters" forecast model may use the Winters multiplicative method; the "Add Winters" forecast model may use the Winters additive method; the "Best Smooth" forecast model may select from the best smoothing model (simple, double, linear, damped trend); the "Best Seasonal Smooth" forecast model may select from the best seasonal smoothing model (add seasonal, Winters, add Winters); the "Best" forecast model may select from the best model (simple, double, linear, damped trend, add seasonal, Winters, add Winters); the "ARIMA" forecast model may use an autoregressive integrated moving average model for smoothing; and the "Unobserved Component" forecast model may use an unobserved component model for smoothing.

The forecast model may select an appropriate smoothing model using holdout sample analysis based on one of several model selection criteria and may output requisition history data extrapolated by the forecast values, requisition history forecasts and confidence limits (actual, predicted, lower confidence limit, upper confidence limit, prediction error, and prediction standard error), model parameter estimates and associated test statistics and probability values, model statistics of fit, etc. Given an input data set that contains transactional variables not recorded at any specific frequency, the forecast model may accumulate the requisition history data to a specific time interval and forecast the accumulated series. Parameters for the forecast model may include a number of periods ahead to forecast, a number of observations before an end of the data where a multistep forecast begins, a size of a holdout sample to be used for model selection, etc.

In an operation 1218, a tenth indicator of a stockpile target optimization model to apply may be received with values of any parameters that may be used to control, effect, or otherwise define execution of the indicated stockpile target optimization model. The stockpile target optimization model predicts where and when and how many should be stocked. Of course, the values of any parameters may be received separately or may be defined using default values. For example, the tenth indicator indicates a name of the stockpile target optimization model or method. The tenth indicator may be received by calibration application 1122 after selection from a user interface window or after entry by a user into a user interface window. A default value for the stockpile target optimization model may further be stored, for example, in computer-readable medium 1108.

The stockpile target optimization model may model the demand by a discrete statistical distribution or a continuous statistical distribution. As an example, the stockpile target optimization model may be selected from "Continuous" or "Discrete". For the discrete distribution, a Bernoulli distribution, a binomial distribution, a Poisson distribution, a negative binomial distribution, a geometric distribution, or a mix of these distributions may be used depending on a ratio between a mean and a variance of the demand. For the continuous distribution, a normal distribution or a mixed-normal distribution may be used.

Of course, the stockpile target optimization model may be labeled or selected in a variety of different manners by the user as understood by a person of skill in the art. In an alternative embodiment, the stockpile target optimization model may not be selectable, and a single stockpile target optimization model is implemented by calibration application 1122. For illustration, a default stockpile target optimization model may be the MIRP Procedure included with SAS® Stockpile Optimization. The "Continuous" stockpile target optimization model using the MIRP Procedure may be used by default or without allowing a selection.

The stockpile target optimization model defines a stockpile replenishment plan for the network based on data stored in network dataset 1130 and/or data computed by the forecast model. The stockpile target optimization model may optimize service levels of locations that are not customer-facing, subject to service-level constraints at customer-facing locations; evaluate amounts of the network subject to service-level constraints at all locations; optimize reorder and order-up-to levels for all locations at each planning period subject to their service-levels constraints; determine order quantities for all locations based on stockpile control policies and current on-hand and pipeline stockpile; and/or estimate KPIs for all locations in the network at each planning period based on stockpile control policies and current on-hand and pipeline stockpile. For illustration, the stockpile target optimization model defines a stockpile replenishment plan for the network that optimizes reorder and order-up-to levels for all locations at each planning period subject to their service-levels constraints. A number of replications may be indicated by the tenth indicator that indicates a number of simulation replications to be used in policy optimization and KPI prediction.

Network dataset 1130 may define different network structures that may include a single location, a two-echelon distribution network, and a two-echelon assembly network. Data computed by the forecast model and/or otherwise provided as input to the stockpile target optimization model may include demand data, stockpile data, and node data. The node data contains information about each SKU-location and may include a batch size, a demand interval, a SKU-location identifier (ID), a SKU-location description, a network ID, a fixed ordering amount, a unit holding amount, a normal lead time, a maximum lead time, a minimum lead time, a next replenishment period, a maximum order size, a minimum order size, a number of periods between replenishments, a replenishment policy type, a service level type, etc. for each of a plurality of nodes included in the supply chain. The demand data may be computed by the forecast model and may include a demand average, a period, a period description, a network ID, a SKU-location ID, a demand variance, etc., for each node of the plurality of nodes to forecast a customer demand. Network dataset 1130 describes linkages between the nodes described in the node data as stated previously. The stockpile data may include a stockpile amount, a period, a network ID, a SKU-location ID, an order-up-to level, a reorder level, etc., for each node of the plurality of nodes.

The replenishment plan consists of control parameters that determine replenishment quantities for each product at each SKU-location defined by the data stored in network dataset 1130 at each period. The stockpile target optimization model may optimize the control parameters so that SL requirements are satisfied at minimum stockpile amounts using a discrete-time theory that defines replenishment orders periodically. A base time period is a time between two replenishment orders such as one day, one week, one month, etc. calibration horizon time period. The base time period may be included as part of the tenth indicator.

In an operation 1220, an eleventh indicator may be received that indicates a calibration horizon time period that defines the time period during which supply chain KPIs are computed. For example, the calibration horizon time period defines a simulation time period as a minimum calibration time, a maximum calibration time, and an incremental calibration time. In an alternative embodiment, the eleventh indicator may not be received. For example, a default value for the calibration horizon time period may be stored, for example, in computer-readable medium 1108 and used automatically. In another alternative embodiment, the calibration horizon time period may not be selectable. Instead, a fixed, predefined time period may be used. The minimum calibration time and the maximum calibration time define a range for the calibration horizon time period with specific calibration times in the range determined based on the incremental calibration time.

In an operation 1222, a twelfth indicator may be received that indicates a stockpile parameter and its associated parameters. In an alternative embodiment, the twelfth indicator may not be received. For example, a default value may be stored, for example, in computer-readable medium 1108 and used automatically. In another alternative embodiment, the stockpile parameter may not be selectable. Instead, fixed, predefined values may be used.

The stockpile parameter may be indicated as a CV, a SL type, or both the CV and SL type. The CV is the ratio between the standard deviation of demand (square root of demand variance) and the demand average. For illustration, the SL type may be selectable from a ready rate, a fill rate, and a back-order ratio. The ready rate may also be called a non-stockout probability, which is a probability of not running out of stock (having positive on-hand stockpile) at the end of a period. A historical ready rate can be measured as a ratio between a number of periods with positive on-hand stockpile and a total number of periods under consideration. The fill rate is a percentage of demand being satisfied immediately by on-hand stockpile. The back-order ratio is a ratio between an average backlog at an end of a period and an average demand of the period.

The associated parameters of the stockpile parameter include a range of values to evaluate for the CV and/or the SL type. Each range may include a minimum value, a maximum value, and an incremental value. For example, if CV is selected as the indicated stockpile parameter, a minimum CV value, a maximum CV value, and an incremental CV value are indicated by the twelfth indicator. As another example, if ready rate SL is selected as the indicated stockpile parameter, a minimum ready rate SL value, a maximum ready rate SL value, and an incremental ready rate SL value are indicated by the twelfth indicator. As yet another example, if both CV and back-order ratio SL are selected as the indicated stockpile parameter, a minimum CV value, a maximum CV value, an incremental CV, a minimum back-order ratio SL value, a maximum back-order ratio SL value, and an incremental back-order ratio SL value are indicated by the twelfth indicator.

In an operation 1224, a thirteenth indicator of a stockpile parameter optimization model to apply may be received with values of any parameters that may be used to control, effect, or otherwise define execution of the stockpile parameter optimization model. The stockpile parameter optimization model is used to select an optimum value for the CV and/or SL based on data stored in aggregated KPI dataset 1136. Of course, the values of any parameters may be received separately or may be defined using default values. For example, the thirteenth indicator indicates a name of the stockpile parameter optimization model or method. The thirteenth indicator may be received by calibration application 1122 after selection from a user interface window or after entry by a user into a user interface window. A default value for the stockpile parameter optimization model may further be stored, for example, in computer-readable medium 1108.

As an example, the stockpile parameter optimization model may be selected from "Linear Programming", "Mixed-Integer Linear Programming", "Quadratic Programming", "Unconstrained Nonlinear Programming", "Constrained Nonlinear Programming", etc. For example, a default stockpile parameter optimization model may be the "Mixed-Integer Linear Programming" stockpile parameter optimization model. Of course, the stockpile parameter optimization model may be labeled or selected in a variety of different manners by the user as understood by a person of skill in the art. In an alternative embodiment, the stockpile parameter optimization model may not be selectable, and a single stockpile parameter optimization model is implemented by calibration application 1122. For illustration, a default stockpile parameter optimization model may be the OPTMODEL Procedure included with SAS/OR®. The "Mixed-Integer Linear Programming" stockpile parameter optimization model using the OPTMODEL Procedure may be used by default or without allowing a selection.

For example, the stockpile parameter optimization model may minimize a total network backorder and maximize a total network SL while satisfying a budget constraint defined by data read from stockpile budget dataset 1128 in similar manners. Additional constraints that the stockpile parameter optimization model may apply while minimizing the total network backorder and maximizing the total network SL include business rules. For illustration, the budget constraint may require that a total stockpile amount across all locations in the network are less than a budget value, for example, stored in stockpile budget dataset 1128.

In an operation 1225, a fourteenth indicator may be received that indicates disbursement dataset 1127. For example, the fourteenth indicator indicates a location and a name of disbursement dataset 1127. As an example, the fourteenth indicator may be received by calibration application 1122 after selection from a user interface window or after entry by a user into a user interface window. In an alternative embodiment, disbursement dataset 1127 may not be selectable. For example, a most-recently created dataset may be used automatically. As another example, a default location and name may be stored and used for disbursement dataset 1127. The fourteenth indicator may indicate a plurality of datasets.

In an operation 1226, stockpile dataset 1126 and disbursement dataset 1127 are opened and read. When stockpile dataset 1126 includes a plurality of datasets, all of the datasets may be opened and read so that the plurality of datasets is processed as a single dataset. As another option, when stockpile dataset 1126 includes a plurality of datasets, each dataset of the plurality of datasets may be opened, read, and processed separately. For example, stockpile dataset 1126 (or the plurality of datasets) may be read from a ROM type computer-readable medium to a RAM type computer-readable medium or other "in-memory" location. When disbursement dataset 1127 includes a plurality of datasets, all of the datasets may be opened and read so that the plurality of datasets is processed as a single dataset. As another option, when disbursement dataset 1127 includes a plurality of datasets, each dataset of the plurality of datasets may be opened, read, and processed separately. For example, disbursement dataset 1127 (or the plurality of datasets) may be read from a ROM type computer-readable medium to a RAM type computer-readable medium or other "in-memory" location.

In an operation 1228, stockpile amount data is computed from the read stockpile dataset 1126 and disbursement dataset 1127 by multiplying the product quantity and the product amount read that occurred during the calibration horizon time period.

In an operation 1230, stockpile budget data is computed from the computed stockpile amount data using the stockpile budget factor value. For example, the stockpile budget data is computed by multiplying the stockpile amount data by the stockpile budget factor value.

In an operation 1232, the computed stockpile budget data is stored to stockpile budget dataset 1128. The stockpile budget factor value may also be stored to stockpile budget dataset 1128.

In an operation 1234, a stockpile parameter value is initialized with an initial stockpile parameter value. For example, if CV is selected as the indicated stockpile parameter, the stockpile parameter value is initialized with either the minimum CV value or the maximum CV value. As a result, the stockpile parameter value can be initialized to the minimum or the maximum value. As another example, if ready rate SL is selected as the indicated stockpile parameter, the stockpile parameter value is initialized with either the minimum ready rate SL value or the maximum ready rate SL value. As another example, if both CV and back-order ratio SL are selected as the indicated stockpile parameter, the stockpile parameter value is initialized with either the minimum CV value, the maximum CV value, the minimum back-order ratio SL value, or the maximum back-order ratio SL value. As a result, the stockpile parameter value can be initialized to the minimum or the maximum value. When both CV and SL values are selected as the indicated stockpile parameter, the stockpile parameter value also can be initialized to either the CV value or the SL value first.

Processing continues in an operation 1236 shown referring to FIG. 12B. In operation 1236, a calibration horizon time is initialized with an initial calibration time value. For example, the initial calibration time value may be defined as the minimum calibration time.

In an operation 1238, requisition history dataset 1132 is opened and read. When requisition history dataset 1132 includes a plurality of datasets, all of the datasets may be opened and read so that the plurality of datasets is processed as a single dataset. As another option, when requisition history dataset 1132 includes a plurality of datasets, each dataset of the plurality of datasets may be opened, read, and processed separately. For example, requisition history dataset 1132 (or the plurality of datasets) may be read from a ROM type computer-readable medium to a RAM type computer-readable medium or other "in-memory" location.

In an operation 1240, demand data is generated using the forecast model and the read requisition history data. The demand data is generated for the calibration horizon time.

In an operation 1242, the requisition history data is updated by executing the stockpile target optimization model with the generated demand data and the stockpile parameter value to define a replenishment plan.

In an operation 1244, simulated KPI data is computed from execution of the stockpile target optimization model with the generated demand data and the stockpile parameter value. The KPIs may include an on-hand disbursement value, a backlog value, a ready rate value, a fill rate value, a back order ratio value, etc. The on-hand disbursement value is calculated as a multiplication of a stockpile quantity and a product (or item) amount. The backlog value is defined as a portion of customer orders that cannot be fulfilled from available stockpile. The ready rate value is a probability of not running out of stock at an end of a period. The ready rate value is measured as a ratio between a number of periods with positive on-hand stockpile and a total number of periods. The fill rate value is a percentage of demand that can be satisfied immediately by on-hand stockpile. The back order ratio value is a ratio between an average backorder at an end of a period and an average demand for the period.

In an operation 1246, the simulated KPI data is stored to simulated KPI data dataset 1134 in association with the calibration horizon time.

In an operation 1248, a determination is made concerning whether or not there is another calibration horizon time value to evaluate. When there is another calibration horizon time value, processing continues in an operation 1250. When there is not another calibration horizon time value, processing continues in an operation 1254. The calibration horizon time value may be compared to the maximum calibration time to determine whether or not there is another calibration horizon time value. For example, when the calibration horizon time value is greater than or equal to the maximum calibration time, there is not another calibration horizon time value to evaluate.

In operation 1250, the calibration horizon time is updated, for example, by adding the incremental calibration time to the calibration horizon time. Processing continues in operation 1240 to generate demand data, update the requisition history data and computed simulated KPI data for the updated calibration horizon time.

Referring to FIG. 12C, in operation 1254, aggregated KPI data is computed for the calibration horizon time period. For example, the simulated KPI data computed for each calibration horizon time period may be averaged for each location and then summed across all locations to compute the aggregated KPI data. As another option, the simulated KPI data computed for each calibration horizon time period may be values averaged during the calibration horizon time period for each location and then summed across all locations to compute the aggregated KPI data. For example, for the simulated fill rate value KPI, the aggregated KPI value may be computed by computing a time average for each location during the calibration horizon time period and then summing the time averages across all locations.

In an operation 1256, the aggregated KPI data is stored to aggregated KPI data dataset 1136 in association with the stockpile parameter value.

In an operation 1258, a determination is made concerning whether or not there is another stockpile parameter value to evaluate. When there is another stockpile parameter value, processing continues in an operation 1260. When there is not another stockpile parameter value, processing continues in an operation 1262.

For example, if CV is selected as the indicated stockpile parameter, the stockpile parameter value may be compared to the maximum CV value to determine whether or not there is another stockpile parameter value when the stockpile parameter value was initialized with the minimum CV value. For example, when the stockpile parameter value is greater than or equal to the maximum CV value, there is not another stockpile parameter value to evaluate. Alternatively, if CV is selected as the indicated stockpile parameter, the stockpile parameter value may be compared to the minimum CV value to determine whether or not there is another stockpile parameter value when the stockpile parameter value was initialized with the maximum CV value. For example, when the stockpile parameter value is less than or equal to the minimum CV value, there is not another stockpile parameter value to evaluate.

As another example, if ready rate SL is selected as the indicated stockpile parameter, the stockpile parameter value may be compared to the maximum ready rate SL value to determine whether or not there is another stockpile parameter value when the stockpile parameter value was initialized with the minimum ready rate SL value. For example, when the stockpile parameter value is greater than or equal to the maximum ready rate SL value, there is not another stockpile parameter value to evaluate. Alternatively, if ready rate SL is selected as the indicated stockpile parameter, the stockpile parameter value may be compared to the minimum ready rate SL value to determine whether or not there is another stockpile parameter value when the stockpile parameter value was initialized with the maximum ready rate SL value. For example, when the stockpile parameter value is less than or equal to the minimum ready rate SL value, there is not another stockpile parameter value to evaluate.

As another example, if both CV and back-order ratio SL are selected as the indicated stockpile parameter, the stockpile parameter value may be compared first to the maximum CV value to determine whether or not there is another stockpile parameter value when the stockpile parameter value was initialized with the minimum CV value. When the stockpile parameter value is greater than or equal to the maximum CV value, the stockpile parameter value is initialized with either the minimum back-order ratio SL value or the maximum back-order ratio SL value to continue processing using the back-order ratio SL as the stockpile parameter value. On subsequent executions of operation 1258, the stockpile parameter value is compared to the maximum back-order ratio SL value or the minimum back-order ratio SL value depending on the whether or not the stockpile parameter value was initialized with the minimum back-order ratio SL value or the maximum back-order ratio SL value, respectively.

Alternatively, if both CV and back-order ratio SL are selected as the indicated stockpile parameter, the stockpile parameter value may be compared first to the minimum CV value to determine whether or not there is another stockpile parameter value when the stockpile parameter value was initialized with the maximum CV value. When the stockpile parameter value is less than or equal to the minimum CV value, the stockpile parameter value is initialized with either the minimum back-order ratio SL value or the maximum back-order ratio SL value to continue processing using the back-order ratio SL as the stockpile parameter value. On subsequent executions of operation 1258, the stockpile parameter value is compared to the maximum back-order ratio SL value or the minimum back-order ratio SL value depending on the whether or not the stockpile parameter value was initialized with the minimum back-order ratio SL value or the maximum back-order ratio SL value, respectively.

In operation 1260, the stockpile parameter value is updated, for example, by adding the incremental value of the associated stockpile parameter to the stockpile parameter value when the stockpile parameter value was initialized with the minimum value or by subtracting the incremental value from the associated stockpile parameter to the stockpile parameter value when the stockpile parameter value was initialized with the maximum value. Processing continues in operation 236 to execute another rolling horizon simulation using the updated stockpile parameter value.

In operation 1262, the stockpile parameter optimization model is executed with the aggregated KPI data stored in aggregated KPI data dataset 1136 and data read from stockpile budget dataset 1128.

In an operation 1264, a calibrated stockpile parameter value is selected based on the results of execution of the stockpile parameter optimization model that ranks each evaluated value of the stockpile parameter value based on the associated, aggregated KPI values.

In an operation 1266, the selected, calibrated stockpile parameter value is output. The selected, calibrated stockpile parameter value may include a value for CV, a value for the SL type, or values for both the CV and the SL type. For example, the selected, calibrated stockpile parameter value may be stored on calibration and validation device 1100 and/or on one or more devices of distributed computing system 1140 in a variety of formats as understood by a person of skill in the art. The selected, calibrated stockpile parameter value further may be output to a display such as display 1116, to a printer such as printer 1120, to a speaker such as speaker 1118, etc.

In an operation 1268, the aggregated KPI values associated with the selected calibrated stockpile parameter value are selected.

In an operation 1270, historical KPI dataset 1138 is opened and read. When historical KPI dataset 1138 includes a plurality of datasets, all of the datasets may be opened and read so that the plurality of datasets is processed as a single dataset. As another option, when historical KPI dataset 1138 includes a plurality of datasets, each dataset of the plurality of datasets may be opened, read, and processed separately. For example, historical KPI dataset 1138 (or the plurality of datasets) may be read from a ROM type computer-readable medium to a RAM type computer-readable medium or other "in-memory" location.

In an operation 1272, a comparison between the read historical KPI data and associated, aggregated KPI values is output. For example, results of the comparison may be stored on calibration and validation device 1100 and/or on one or more devices of distributed computing system 1140 in a variety of formats as understood by a person of skill in the art. The results of the comparison further may be output to a display such as display 1116, to a printer such as printer 1120, to a speaker such as speaker 1118, etc.

Figure 14:
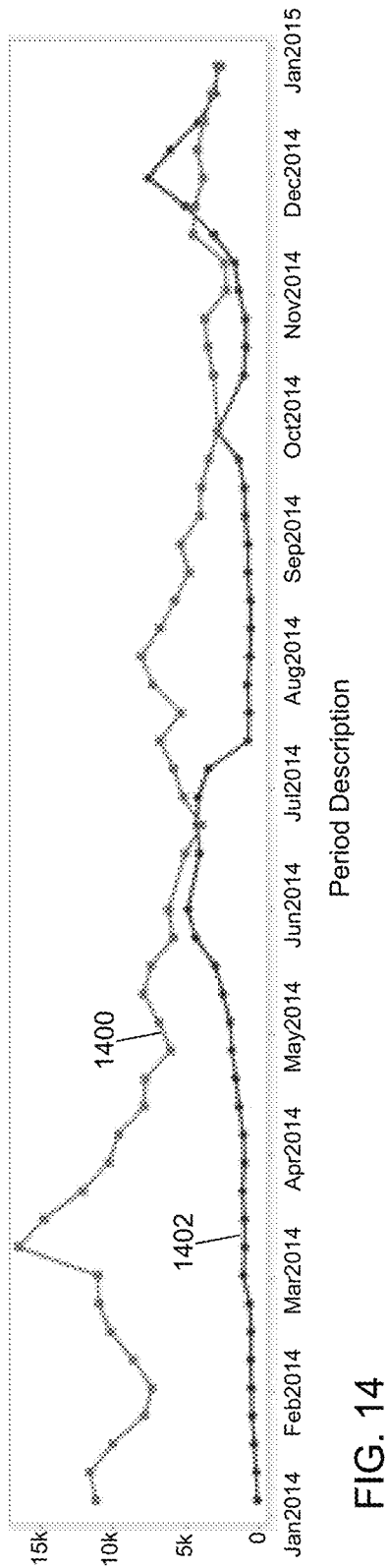
FIG. 14 compares historical backlog results with calibrated backlog results computed using the calibration and validation device of FIG. 11 in accordance with an illustrative embodiment.

For example, referring to FIG. 14, a first result curve 1400 and a second result curve 1402. Data represented by first result curve 1400 was read from historical KPI dataset 1138 and shows a historical backlog KPI during the calibration horizon time period from January 2014 to January 2015 using an incremental calibration time of one week. Data represented by second result curve 1402 was generated by calibration application 1122 and shows aggregated values computed in operation 1254 for the backlog KPI computed during the calibration horizon time period from January 2014 to January 2015 using an incremental calibration time of one week and the selected, calibrated stockpile parameter value.

Figure 15:
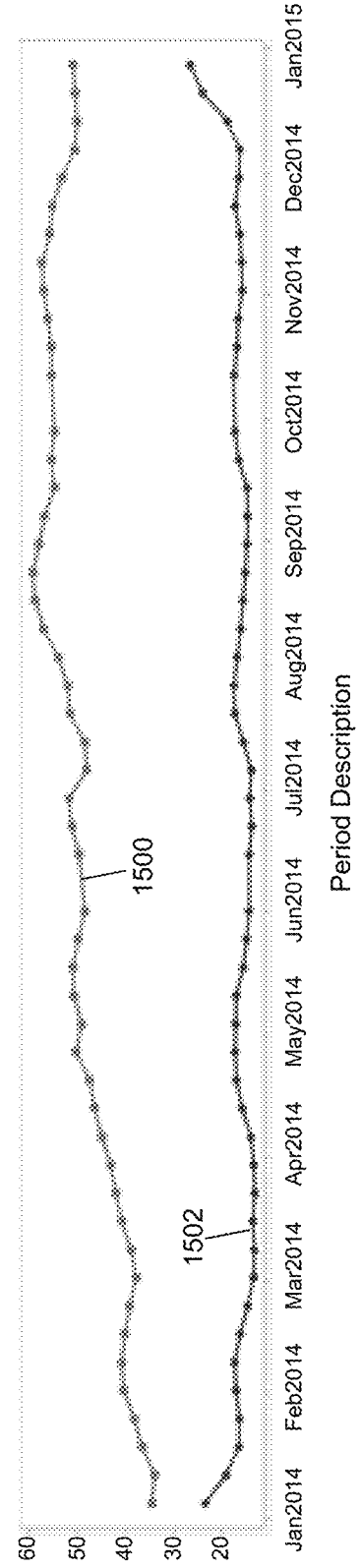
FIG. 15 compares historical on-hand disbursement results with calibrated on-hand disbursement results computed using the calibration and validation device of FIG. 11 in accordance with an illustrative embodiment.

As another example, referring to FIG. 15, a third result curve 1500 and a fourth result curve 1502. Data represented by third result curve 1500 was read from historical KPI dataset 1138 and shows a historical on-hand disbursement KPI during the calibration horizon time period from January 2014 to January 2015 using an incremental calibration time of one week. Data represented by fourth result curve 1502 was generated by calibration application 1122 and shows aggregated values for the on-hand disbursement KPI computed during the calibration horizon time period from January 2014 to January 2015 using an incremental calibration time of one week and the selected, calibrated stockpile parameter value. Of course, additional graphical comparisons may be output as well as various tabular results that compare the historical KPI data to the aggregated KPI data.

Figure 13:
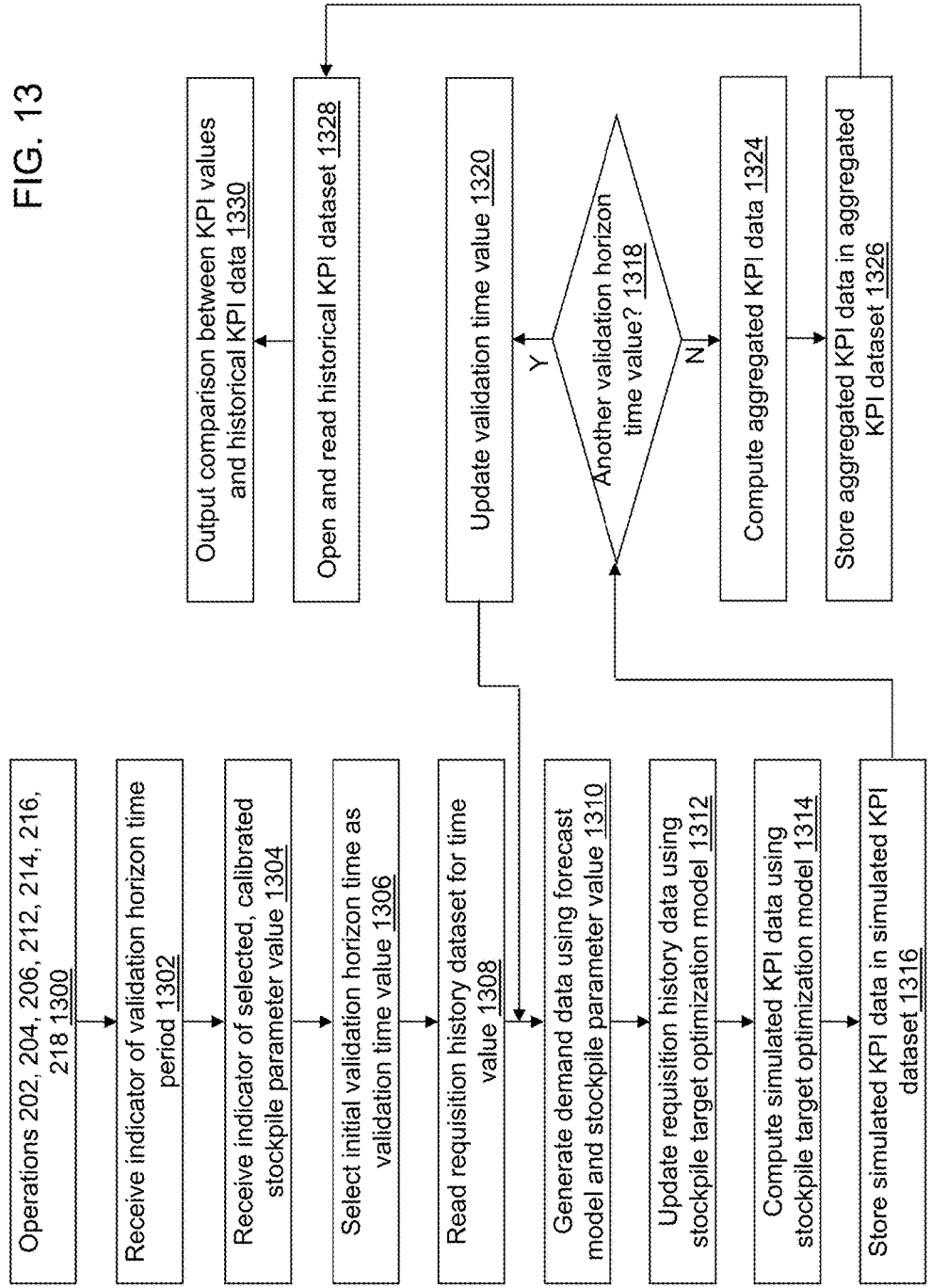
FIG. 13 depicts a flow diagram illustrating additional examples of operations performed by the calibration and validation device of FIG. 11 in accordance with an illustrative embodiment.

Referring to FIG. 13, example operations performed by validation application 1124 are described. Additional, fewer, or different operations may be performed depending on the embodiment of validation application 1124. The operations further may be implemented by calibration application 1122 or integrated in another application that utilizes calibration application 1122 and/or validation application 1124. The order of presentation of the operations of FIG. 13 is not intended to be limiting. Although some of the operational flows are presented in sequence, the various operations may be performed in various repetitions, concurrently (in parallel, for example, using threads and/or a distributed computing system), and/or in other orders than those that are illustrated.

Validation application 1124 may perform operations 1202, 1204, 1206, 1212, 1214, 1216, and 1218 as described in FIG. 12A.

Similar to operation 1220, in an operation 1302, a thirteenth indicator may be received that indicates a validation horizon time period that defines the time period during which supply chain KPIs are validated. For example, the validation horizon time period defines a validation time period as a minimum validation time, a maximum validation time, and an incremental validation time. In an alternative embodiment, the thirteenth indicator may not be received. For example, a default value for the validation horizon time period may be stored, for example, in computer-readable medium 1108 and used automatically. In another alternative embodiment, the validation horizon time period may not be selectable. Instead, a fixed, predefined time period may be used.

In an operation 1304, a thirteenth indicator may be received that indicates the calibrated stockpile parameter value selected, for example, in operation 1264 of FIG. 12A. Again, the selected, calibrated stockpile parameter value may include a value for CV, a value for the SL type, or values for both the CV and the SL type. For illustration, the thirteenth indicator may be entered by a user into a user interface window or read from a file or other memory location to which the value was output in operation 1266.

Similar to operation 1236, in an operation 1306, a validation horizon time is initialized with an initial validation time value. For example, the initial validation time value may be defined as the minimum validation time.

Similar to operation 1238, in an operation 1308, requisition history dataset 1132 is opened and read.

Similar to operation 1240, in an operation 1310, demand data is generated using the forecast model and the read requisition history data. The demand data is generated for the validation horizon time.

Similar to operation 1242, in an operation 1312, the requisition history data is updated by executing the stockpile target optimization model with the generated demand data and the stockpile parameter value to define a replenishment plan.

Similar to operation 1244, in an operation 1314, simulated KPI data is computed from execution of the stockpile target optimization model with the generated demand data and the stockpile parameter value.

Similar to operation 1246, in an operation 1316, the simulated KPI data is stored to simulated KPI data dataset 1134 in association with the validation horizon time.

Similar to operation 1248, in an operation 1318, a determination is made concerning whether or not there is another validation horizon time value to evaluate. When there is another validation horizon time value, processing continues in an operation 1320. When there is not another validation horizon time value, processing continues in an operation 1324. The validation horizon time value may be compared to the maximum validation time to determine whether or not there is another validation horizon time value. For example, when the validation horizon time value is greater than or equal to the maximum validation time, there is not another validation horizon time value to evaluate.

Similar to operation 1250, in an operation 1320, the validation horizon time is updated, for example, by adding the incremental validation time to the validation horizon time. Processing continues in operation 310 to generate demand data, update the requisition history data and computed simulated KPI data for the updated validation horizon time.

Similar to operation 1254, in an operation 1324, aggregated KPI data is computed for the validation horizon time period.

Similar to operation 1256, in an operation 1326, the aggregated KPI data is stored to aggregated KPI data dataset 1136.

Similar to operation 1270, in an operation 1328, historical KPI dataset 1138 is opened and read.

Similar to operation 1272, in an operation 1330, a comparison between the read historical KPI data and aggregated KPI data is output. For example, referring to FIG. 16, a fifth result curve 1600 and a sixth result curve 1602. Data represented by fifth result curve 1600 was read from historical KPI dataset 1138 and shows a historical backlog KPI during the validation horizon time period from Jan. 1, 2015 to Jul. 1, 2015 using an incremental calibration time of one week. Data represented by sixth result curve 1602 was generated by validation application 1124 and shows aggregated values computed in operation 1254 for the backlog KPI computed during the validation horizon time period from Jan. 1, 2015 to Jul. 1, 2015 using an incremental validation time of one week.

As another example, referring to FIG. 17, a seventh result curve 1700 and an eighth result curve 1702. Data represented by seventh result curve 1700 was read from historical KPI dataset 1138 and shows a historical on-hand disbursement KPI during the validation horizon time period from Jan. 1, 2015 to Jul. 1, 2015 using an incremental calibration time of one week. Data represented by eighth result curve 1502 was generated by validation application 1124 and shows aggregated values for the on-hand disbursement KPI computed during the validation horizon time period from Jan. 1, 2015 to Jul. 1, 2015 using an incremental validation time of one week. Of course, additional graphical comparisons may be output as well as various tabular results that compare the historical KPI data to the aggregated KPI data.

In modeling a typical distribution system, the SL and CV values are selected and remain unchanged with no verification or validation that the selected values are appropriate. Calibration application 1122 provides an automated process by which the SL and CV values can be selected. Validation application 1124 provides an automated process by which the SL and CV values selected using calibration application 1122 or otherwise selected can be validated to confirm and quantify the benefit that may result when stockpile optimization is used for decision making in a distribution chain.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    automatically select a calibrated parameter value of a first parameter;
    receive an indicator of a validation horizon time period, wherein the validation horizon time period includes a start time, a stop time, and an incremental time;
    automatically initialize a validation time value based on the start time;
    automatically read requisition history data from a requisition history dataset, wherein the requisition history data includes previous requisitions placed during a time period prior to the start time for an item in a network that includes a plurality of nodes;
    (a) automatically generate demand data for each node of the plurality of nodes using a forecast model with the requisition history data and the selected calibrated parameter value, wherein the forecast model is configured to forecast a demand associated with the item at each node of the plurality of nodes;
    (b) automatically update the requisition history data and compute a simulated key performance indicator (KPI) value of a KPI by executing a target optimization model with the generated demand data, wherein the target optimization model is configured to determine a number and a time a new requisition is placed for the item at each node of the plurality of nodes;
    (c) automatically store the computed, simulated KPI value in association with the selected initial validation time value;
    (d) automatically update the initialized validation time value using the incremental time;
    automatically repeat (a)-(d) until the updated, initialized validation time value is greater than or equal to the stop time;
    automatically compute an aggregated KPI value as a sum of the stored KPI values for each node at each value of the initialized validation time value;
    output a comparison between the computed, aggregated KPI values and historical KPI data computed from an actual requisition history for each node of the plurality of nodes during the validation horizon time period; and
    automatically optimize a stockpile of the item in the network for each node of the plurality of nodes using the selected calibrated parameter value.

2. The non-transitory computer-readable medium of claim 1, wherein the KPI is at least one of an on-hand disbursement value, a backlog value, a ready rate value, a fill rate value, and a back order ratio value.

3. The non-transitory computer-readable medium of claim 1, wherein the first parameter is at least one of a service level and a coefficient of variation.

4. The non-transitory computer-readable medium of claim 1, wherein the computer-readable instructions further cause the computing device to automatically output a comparison between the computed, aggregated KPI values and historical KPI data computed from an actual requisition history for each node of the plurality of nodes during the validation horizon time period to verify that the selected calibrated parameter value is configured correctly.

5. The non-transitory computer-readable medium of claim 1, wherein selecting the calibrated parameter value of the first parameter comprises computer-readable instructions that further cause the computing device to:
    receive indicators of a start value, a stop value, and an incremental value of the first parameter;
    receive an indicator of a calibration horizon time period, wherein the calibration horizon time period includes a calibration start time, a calibration stop time, and a calibration incremental time;
    automatically initialize a calibration time value based on the calibration start time;
    automatically select a test value for the first parameter as the start value;
    automatically read second requisition history data from the requisition history dataset, wherein the second requisition history data includes previous requisitions placed during the time period prior to the calibration start time for the item in the network that includes the plurality of nodes;
    (e) automatically generate second demand data for each node of the plurality of nodes using the forecast model with the second requisition history data and the selected test value;
    (f) automatically update the second requisition history data and compute a second simulated KPI value of the KPI by executing the target optimization model with the generated second demand data;

(g) automatically store the computed, second simulated KPI value in association with the selected test value and the initialized calibration time value (h) automatically update the initialized calibration time value using the calibration incremental time; and (i) automatically repeat (e)-(h) until the updated, initialized calibration time value is greater than or equal to the calibration stop time.

6. The non-transitory computer-readable medium of claim 5, wherein after (i), selecting the calibrated parameter value of the first parameter further comprises computer-readable instructions that further cause the computing device to:

(j) automatically compute a second aggregated KPI value as a sum of the stored second KPI values for each node at each value of the initialized calibration time value;

(k) automatically update the selected test value using the incremental value;

(l) automatically repeat (e)-(k) until the updated, selected test value is greater than or equal to the stop value; and automatically execute a stockpile parameter optimization model with the computed, second aggregated KPI values and the computed second aggregated KPI value;

wherein the calibrated parameter value of the first parameter is selected based on results of execution of the stockpile parameter optimization model that ranks each value of the selected test value.

7. The non-transitory computer-readable medium of claim 5, wherein the computer-readable instructions further cause the computing device to automatically output the selected calibrated parameter value.

8. The non-transitory computer-readable medium of claim 5, wherein the computer-readable instructions further cause the computing device to automatically output a comparison between the computed, second aggregated KPI values and historical KPI data computed from an actual requisition history for each node of the plurality of nodes during the calibration horizon time period.

9. The non-transitory computer-readable medium of claim 6, wherein the stockpile parameter optimization model minimizes a total network backorder while satisfying a budget constraint defined by data read from a stockpile budget dataset.

10. The non-transitory computer-readable medium of claim 6, wherein the stockpile parameter optimization model maximizes a total network service level while satisfying a budget constraint defined by data read from a stockpile budget dataset.

11. The non-transitory computer-readable medium of claim 1, wherein the automatically selecting the calibrated parameter value of the first parameter and the automatically computing the aggregated KPI value are performed periodically.

12. A computing device comprising:
a processor; and
a non-transitory computer-readable medium operably coupled to the processor, the computer-readable medium having computer-readable instructions stored thereon that, when executed by the processor, cause the computing device to
automatically select a calibrated parameter value of a first parameter;
receive an indicator of a validation horizon time period, wherein the validation horizon time period includes a start time, a stop time, and an incremental time;
automatically initialize a validation time value based on the start time;

automatically read requisition history data from a requisition history dataset, wherein the requisition history data includes previous requisitions placed during a time period prior to the start time for an item in a network that includes a plurality of nodes;

(a) automatically generate demand data for each node of the plurality of nodes using a forecast model with the requisition history data and the selected calibrated parameter value, wherein the forecast model is configured to forecast a demand associated with the item at each node of the plurality of nodes;

(b) automatically update the requisition history data and compute a simulated key performance indicator (KPI) value of a KPI by executing a target optimization model with the generated demand data, wherein the target optimization model is configured to determine a number and a time a new requisition is placed for the item at each node of the plurality of nodes;

(c) automatically store the computed, simulated KPI value in association with the selected initial validation time value;

(d) automatically update the initialized validation time value using the incremental time;

automatically repeat (a)-(d) until the updated, initialized validation time value is greater than or equal to the stop time;

automatically compute an aggregated KPI value as a sum of the stored KPI values for each node at each value of the initialized validation time value;

output a comparison between the computed, aggregated KPI values and historical KPI data computed from an actual requisition history for each node of the plurality of nodes during the validation horizon time period; and automatically optimize a stockpile of the item in the network for each node of the plurality of nodes using the selected calibrated parameter value and the computed aggregated KPI value.

13. The computing device of claim 12, wherein the first parameter is at least one of a service level and a coefficient of variation.

14. The computing device of claim 12, wherein the computer-readable instructions further cause the computing device to automatically output a comparison between the computed, aggregated KPI values and historical KPI data computed from an actual requisition history for each node of the plurality of nodes during the validation horizon time period to verify that the selected calibrated parameter value is configured correctly.

15. The computing device of claim 12, wherein selecting the calibrated parameter value of the first parameter comprises computer-readable instructions that further cause the computing device to:

receive indicators of a start value, a stop value, and an incremental value of the first parameter;

receive an indicator of a calibration horizon time period, wherein the calibration horizon time period includes a calibration start time, a calibration stop time, and a calibration incremental time;

automatically initialize a calibration time value based on the calibration start time;

automatically select a test value for the first parameter as the start value;

automatically read second requisition history data from the requisition history dataset, wherein the second requisition history data includes previous requisitions placed during the time period prior to the calibration start time for the item in the network that includes the plurality of nodes;

(e) automatically generate second demand data for each node of the plurality of nodes using the forecast model with the second requisition history data and the selected test value;

(f) automatically update the second requisition history data and compute a second simulated KPI value of the KPI by executing the target optimization model with the generated second demand data;

(g) automatically store the computed, second simulated KPI value in association with the selected test value and the initialized calibration time value (h) automatically update the initialized calibration time value using the calibration incremental time; and (i) automatically repeat (e)-(h) until the updated, initialized calibration time value is greater than or equal to the calibration stop time.

16. The computing device of claim 15, wherein after (i), selecting the calibrated parameter value of the first parameter further comprises computer-readable instructions that further cause the computing device to:

(j) automatically compute a second aggregated KPI value as a sum of the stored second KPI values for each node at each value of the initialized calibration time value;

(k) automatically update the selected test value using the incremental value;

(l) automatically repeat (e)-(k) until the updated, selected test value is greater than or equal to the stop value; and automatically execute a stockpile parameter optimization model with the computed, second aggregated KPI values and the computed second aggregated KPI value;

wherein the calibrated parameter value of the first parameter is selected based on results of execution of the stockpile parameter optimization model that ranks each value of the selected test value.

17. The computing device of claim 15, wherein the computer-readable instructions further cause the computing device to automatically output the selected calibrated parameter value.

18. The computing device of claim 15, wherein the computer-readable instructions further cause the computing device to automatically output a comparison between the computed, second aggregated KPI values and historical KPI data computed from an actual requisition history for each node of the plurality of nodes during the calibration horizon time period.

19. The computing device of claim 16, wherein the stockpile parameter optimization model minimizes a total network backorder while satisfying a budget constraint defined by data read from a stockpile budget dataset.

20. The computing device of claim 16, wherein the stockpile parameter optimization model maximizes a total network service level while satisfying a budget constraint defined by data read from a stockpile budget dataset.

21. A method of optimizing a stockpile a stockpile of an item comprising:

automatically selecting, by a computing device, a calibrated parameter value of a first parameter;

receive receiving an indicator of a validation horizon time period, wherein the validation horizon time period includes a start time, a stop time, and an incremental time;

automatically initializing, by the computing device, a validation time value based on the start time;

automatically reading, by the computing device, requisition history data from a requisition history dataset, wherein the requisition history data includes previous requisitions placed during a time period prior to the start time for an item in a network that includes a plurality of nodes;

(a) automatically generating, by the computing device, demand data for each node of the plurality of nodes using a forecast model with the requisition history data and the selected calibrated parameter value, wherein the forecast model is configured to forecast a demand associated with the item at each node of the plurality of nodes;

(b) automatically updating, by the computing device, the requisition history data and compute a simulated key performance indicator (KPI) value of a KPI by executing a target optimization model with the generated demand data, wherein the target optimization model is configured to determine a number and a time a new requisition is placed for the item at each node of the plurality of nodes;

(c) automatically storing, by the computing device, the computed, simulated KPI value in association with the selected initial validation time value;

(d) automatically updating, the initialized validation time value using the incremental time;

automatically repeating, by the computing device, (a)-(d) until the updated, initialized validation time value is greater than or equal to the stop time;

automatically computing, by the computing device, an aggregated KPI value as a sum of the stored KPI values for each node at each value of the initialized validation time value;

outputting, by the computing device, a comparison between the computed, aggregated KPI values and historical KPI data computed from an actual requisition history for each node of the plurality of nodes during the validation horizon time period; and automatically optimizing, by the computing device, a stockpile of the item in the network for each node of the plurality of nodes using the selected calibrated parameter value and the computed aggregated KPI value.

22. The method of claim 21, wherein the KPI is at least one of an on-hand disbursement value, a backlog value, a ready rate value, a fill rate value, and a back order ratio value.

23. The method of claim 21, wherein the first parameter is at least one of a service level and a coefficient of variation.

24. The method of claim 21, further comprising automatically outputting, by the computing device, a comparison between the computed, aggregated KPI values and historical KPI data computed from an actual requisition history for each node of the plurality of nodes during the validation horizon time period to verify that the selected calibrated parameter value is configured correctly.

25. The method of claim 21, wherein selecting the calibrated parameter value of the first parameter comprises:

receiving indicators of a start value, a stop value, and an incremental value of the first parameter;

receiving an indicator of a calibration horizon time period, wherein the calibration horizon time period includes a calibration start time, a calibration stop time, and a calibration incremental time;

automatically initializing, by the computing device, a calibration time value based on the calibration start time;

automatically selecting, by the computing device, a test value for the first parameter as the start value;

automatically reading, by the computing device, second requisition history data from the requisition history dataset, wherein the second requisition history data includes previous requisitions placed during the time period prior to the calibration start time for the item in the network that includes the plurality of nodes;

(e) automatically generating, by the computing device, second demand data for each node of the plurality of nodes using the forecast model with the second requisition history data and the selected test value;

(f) automatically updating, by the computing device, the second requisition history data and compute a second simulated KPI value of the KPI by executing the target optimization model with the generated second demand data;

(g) automatically storing, by the computing device, the computed, second simulated KPI value in association with the selected test value and the initialized calibration time value (h) automatically updating, by the computing device, the initialized calibration time value using the calibration incremental time; and (i) automatically repeating, by the computing device, (e)-(h) until the updated, initialized calibration time value is greater than or equal to the calibration stop time.

26. The method of claim 25, wherein after (i), selecting the calibrated parameter value of the first parameter further comprises:

(j) automatically computing, by the computing device, a second aggregated KPI value as a sum of the stored second KPI values for each node at each value of the initialized calibration time value;

(k) automatically updating, by the computing device, the selected test value using the incremental value;

(l) automatically repeating, by the computing device, (e)-(k) until the updated, selected test value is greater than or equal to the stop value; and automatically executing, by the computing device, a stockpile parameter optimization model with the computed, second aggregated KPI values and the computed second aggregated KPI value;

wherein the calibrated parameter value of the first parameter is selected based on results of execution of the stockpile parameter optimization model that ranks each value of the selected test value.

27. The method of claim 25, further comprising automatically outputting, by the computing device, the selected calibrated parameter value.

28. The method of claim 25, further comprising automatically outputting, by the computing device, a comparison between the computed, second aggregated KPI values and historical KPI data computed from an actual requisition history for each node of the plurality of nodes during the calibration horizon time period.

29. The method of claim 26, wherein the stockpile parameter optimization model minimizes a total network backorder while satisfying a budget constraint defined by data read from a stockpile budget dataset.

30. The method of claim 26, wherein the stockpile parameter optimization model maximizes a total network service level while satisfying a budget constraint defined by data read from a stockpile budget dataset.

* * * * *

UNITED STATES PATENT AND TRADEMARK OFFICE
CERTIFICATE OF CORRECTION

PATENT NO. : 9,705,751 B1
APPLICATION NO. : 15/335070
DATED : July 11, 2017
INVENTOR(S) : Jinxin Yi et al.

Page 1 of 1

It is certified that error appears in the above-identified patent and that said Letters Patent is hereby corrected as shown below:

In the Claims

Claim 21, Column 49, Line 62:
Delete "receive receiving an indicator" and replace with --receiving an indicator--

Claim 21, Column 50, Line 26:
Delete "automatically updating, the initialized validation time" and replace with --automatically updating, by the computing device, the initialized validation time--

Signed and Sealed this
Twenty-first Day of November, 2017

Joseph Matal
*Performing the Functions and Duties of the
Under Secretary of Commerce for Intellectual Property and
Director of the United States Patent and Trademark Office*